United States Patent
Maeda

[11] Patent Number: 6,159,259
[45] Date of Patent: Dec. 12, 2000

[54] FILTER FOR COMPRESSED AIR

[75] Inventor: Sadao Maeda, Okazaki, Japan

[73] Assignees: Maeda Limited; Maeda Shell Services Co., Ltd., both of Japan

[21] Appl. No.: 09/202,509

[22] PCT Filed: May 21, 1997

[86] PCT No.: PCT/JP97/01720

§ 371 Date: Dec. 15, 1998

§ 102(e) Date: Dec. 15, 1998

[87] PCT Pub. No.: WO98/52674

PCT Pub. Date: Nov. 26, 1998

[51] Int. Cl.[7] .................................................. B01D 46/00
[52] U.S. Cl. .............................. 55/323; 55/478; 55/480; 55/525; 55/DIG. 17
[58] Field of Search ........................ 55/318, 323, 321, 55/478, 480, 481, 486, 525, 527, DIG. 17

[56] References Cited

U.S. PATENT DOCUMENTS

| | | |
|---|---|---|
| 1,750,632 | 3/1930 | Farmer . |
| 3,733,792 | 5/1973 | Taylor . |
| 4,234,324 | 11/1980 | Dodge, Jr. . |
| 4,487,618 | 12/1984 | Mann . |
| 4,589,983 | 5/1986 | Wydevan . |
| 4,925,466 | 5/1990 | Overby . |
| 5,011,519 | 4/1991 | Maeda . |
| 5,015,379 | 5/1991 | Drori . |
| 5,120,331 | 6/1992 | Landy . |
| 5,261,946 | 11/1993 | Overby . |
| 5,888,259 | 3/1999 | Maeda . |

FOREIGN PATENT DOCUMENTS

| | | |
|---|---|---|
| 0 370 521 | 5/1990 | European Pat. Off. . |
| 59-55330 | 3/1984 | Japan . |
| 62-99313 | 6/1987 | Japan . |
| 5-200217 | 8/1993 | Japan . |
| 9-10533 | 1/1997 | Japan . |

*Primary Examiner*—David A. Simmons
*Assistant Examiner*—Fred Prince
*Attorney, Agent, or Firm*—Burr & Brown

[57] ABSTRACT

A filter device including a first filter having a first packing accommodated in a first sleeve thereof, and a second filter having a second packing accommodated in a second sleeve thereof, each one of the first and second packings cooperating with two retainer plates and a core bar to constitute a corresponding one of first and second filter elements, the two retainer plates being disposed on axially opposite ends of the corresponding one of the first and second packings, the core bar axially extending to pass through a center of the corresponding one of the first and second packings such that the two retainer plates engage the core bar at respective opposite ends of the core bar, the core bar being provided with a pull tab at one of the opposite ends of the core bar, so that the first and second packings are introduced and removed into and from the first and second sleeves, respectively.

7 Claims, 14 Drawing Sheets

(a)

(b)

(a)

(b)

(c)

FILTER FOR COMPRESSED AIR

TECHNICAL FIELD

The present invention relates in general to a filter device for compressed air which has filter means having suitable packings accommodated in sleeves.

BACKGROUND ART

Generally, passages for supplying compressed air to various pneumatically operated components used in various factories and atomic plants, for example, are usually provided with filter devices for removing water and oil contained in the compressed air, for the purpose of protecting the pneumatic components or improving the performance of those components.

One type of such a filter device for compressed air is disclosed in JP-A-5-200217, which is constructed to include two kinds of filter means. Namely, this filter device has first filter means having a suitable first packing accommodated in a sleeve, and second filter means having a suitable second packing accommodated in another sleeve. The first and second filter means are disposed parallel to each other. At one of axially opposite ends of the first and second filter means, there is disposed a manifold which includes an inlet passage portion and an outlet passage portion. The inlet passage portion has an inlet passage formed therein, through which the compressed air is introduced into the filter device. The outlet passage portion has an outlet passage formed therein, through which the compressed air is fed out from the filter device. The inlet and outlet passages communicate with the first and second filter means, respectively. At the other of axially opposite ends of the first and second filter means, there is disposed an enclosed trap chamber having a suitable volume, such that each of the first and second filter means communicates with the trap chamber. The thus arranged first and second filter means, the trap chamber and the manifold are assembled together and fixed to each other by a plurality of bolts which extend through the manifold and which are screwed in the trap chamber. According to this arrangement, the compressed air entering the inlet passage of the manifold is fed into the outlet passage of the manifold through the first filter means, the trap chamber, and the second filter means, whereby an air passage for the compressed air is formed through the filter device.

In the filter device constructed as described above, usually, the first packing of the first filter means is a roll of a wire mesh fabric formed by weaving or knitting stainless steel fibers or other metallic materials, so that vapor and/or liquid particles like water and oil contained in the compressed air are condensed or coalesced as the compressed air passes through the first filter means, while the second packing of the second filter means is a wound fabric mesh formed by weaving or knitting cotton fibers or other materials, so that the liquid particles contained in the compressed air are absorbed or vaporized as the compressed air passes through the second filter means.

Thus, in the filter device disclosed in the above-indicated publication, the vapor and/or liquid particles are condensed or coalesced as the compressed air is introduced into the trap chamber through the inlet passage of the manifold and the first filter means, so that the vapor and/or liquid particles are separated from the compressed air. Further, the compressed air from which the vapor and/or liquid particles have been thus separated is introduced into the second filter means through the trap chamber, so that the amount of the liquid particles remaining in the compressed air is minimized.

The first and second packings constituting the first and second filter means, respectively, are required to be replaced with clean ones when the packings get clogged with dust and/or grease. The replacement requires the following operations.

First, the plurality of bolts serving to connect the first and second filter means, the manifold and the trap chamber into an integral assembly are all removed, and the assembly is disassembled into the four parts. Secondly, the clogged first and second packings which are accommodated in the first and second sleeves, respectively, are replaced with clean ones. The first and second filter means, the trap chamber and the manifold are then reassembled together and fixed to each other, as described before, by screwing the plurality of bolts in the respective positions.

That is, in the conventional filter device disclosed in the above-identified publication, each time the first and second packings of the first and second filter means are replaced, the device has to be disassembled into the parts before the replacement, and the parts have to be reassembled into the device after the replacement.

The filter device is advantageously used in various factories, atomic plants and medical field owing to its high filtering performance. However, the filter device requires the above-described operations for replacing the first and second packings, which operations are cumbersome and time-consuming, as described above. There is still a room for improvement in this filter device.

The present inventor disclosed a filter device for compressed air in JP-A-9-10533 having a construction which solves the problem with the above-described filter device. The disclosed filter device includes first filter means having a first packing accommodated in a first sleeve, second filter means having a second packing accommodated in a second sleeve, an inlet passage portion defining an inlet passage which connects an exterior of the filter device and the first sleeve to introduce the compressed air from the exterior into the first filter means, a guide passage portion defining a guide passage which connects the first sleeve and the second sleeve to guide the compressed air from the first filter means into the second filter means, and an outlet passage portion defining an outlet passage which connects the second sleeve and the exterior to feed the compressed air out of the second filter means to the exterior. The first and second sleeves, the inlet passage portion, the guide passage portion and the outlet passage portion are formed of a synthetic resin, integrally with each other, so as to constitute a body of the filter device. The body is provided with access openings through which the first and second packings are removed from the filter device. To each of the access openings, a closure member is removably attached so as to fluid-tightly close the access openings.

This filter device for compressed air is constructed such that all the parts cooperating to form a fluid passage in the filter device are formed of a synthetic resin, integrally with each other so as to constitute the body of the filter device, and the body is provided with the access openings through which the first and second packings are removed. Further, the closure member is removably attached to each of the access openings so as to fluid-tightly close the access openings. According to this filter device, therefore, for replacing the clogged first and second packings, it is not necessary to carry out time-consuming operations such as disassembling of the filter device into the component parts and reassembling of the parts into the device. In this filter device, the clogged first and second packings can be replaced by new ones, by simply removing the caps from the respective access openings and re-attaching the caps to the respective access openings. Thus, the replacement of the first and second packings can be made more easily and quickly than in the conventional device.

However, as a result of further study made by the present inventor, this filter device proved to have the following problem. Upon the replacement of the clogged first and second packings in this filter device, the clogged packings are removed by a suitable tool formed of a wire or other material, since it is very difficult for the operator to pick the packings out of the respective sleeves, directly with the fingers. That is, the tool is put into the first and second sleeves through the respective access openings after removing the closure members from the access openings, so as to take out the clogged first and second packings. Thus, this filter device requires the tool for the replacement of the first and second packings and a certain amount of cumbersome work for taking out the clogged first and second packings through the access openings from which the closure members have been removed, although the device is constructed such that the closure members can be removed from the access openings without using a tool.

DISCLOSURE OF INVENTION

The present invention was developed in the light of the above situations. It is therefore an object of the present invention to provide an improved construction of the filter device for compressed air, which construction makes it possible to introduce and remove the packings of the filter means without using any tools, for thereby easily and quickly replacing the packings.

The above object may be achieved according to the present invention which provides a filter device for compressed air including first filter means having a first packing accommodated in a first sleeve thereof, second filter means having a second packing accommodated in a second sleeve thereof, an inlet passage portion defining an inlet passage which connects an exterior of the filter device and the first sleeve to introduce the compressed air from the exterior into the first filter means, a guide passage portion defining a guide passage which connects the first sleeve and the second sleeve to guide the compressed air from the first filter means into the second filter means, and an outlet passage portion defining an outlet passage which connects the second sleeve and the exterior to feed the compressed air out of the second filter means to the exterior, the compressed air which has been introduced through the inlet passage portion being introduced through the first filter means into the guide passage portion, whereby vapor or liquid particles contained in the compressed air are condensed or coalesced to be separated from the compressed air, the compressed air from which the vapor or liquid particles have been separated being further introduced through the guide passage portion into the second filter means, whereby the liquid particles remaining in the compressed air are removed, the filter device being characterized in that (a) the first and second sleeves, the inlet passage portion, the guide passage portion and the outlet passage portion are formed of a synthetic resin, integrally with each other, so as to constitute a body of the filter device, the body being provided with access openings through which the first and second packings are removed from the filter device, each of the access openings being provided with a closure member which is removably attached to each of the access openings so as to fluid-tightly close the access openings, (b) the first sleeve includes a communication portion which communicates with the inlet passage portion and which is large enough to permit the first packing accommodated in the first sleeve to be removed therethrough, while the second sleeve includes a communication portion which communicates with the outlet passage portion and which is large enough to permit the second packing accommodated in the second sleeve to be removed therethrough, the access openings being formed in the inlet and outlet passage portions so that the first and second packings can be removed through the access openings from the first and second sleeves, respectively, and (c) each one of the first and second packings cooperates with two retainer plates and a core bar to constitute a corresponding one of first and second filter elements, the two retainer plates each having a plurality of through-holes formed therethrough being disposed on axially opposite ends of the corresponding one of the first and second packings, the core bar extending in an axial direction of the corresponding one of the first and second packings to pass a center of the one of the first and second packings such that the two retainer plates engage the core bar at respective opposite ends of the core bar, the core bar being provided with a pull tab at one of the opposite ends of the core bar, so that the first and second packings are introduced into and removed from the first and second sleeves, respectively.

The above-described filter device for compressed air according to the present invention is constructed such that all the parts cooperating to form a fluid passage in the filter device are formed of a synthetic resin, integrally with each other so as to constitute a body of the filter device, and the body is provided with access openings through which the first and second packings are removed. Further, the closure member is removably attached to each of the access openings so as to fluid-tightly close the access openings. According to the present filter device, therefore, for replacing the clogged first and second packings, it is not necessary to carry out time-consuming operations such as disassembling of the filter device into the component parts and reassembling of the parts into the device. In this filter device, the access openings can be easily opened and closed, by simply removing the caps from the respective access openings and reattaching the caps to the respective access openings. Thus, the first and second packings can be easily made exposed.

Each one of the first and second packings cooperates with the two retainer plates and the core bar to constitute a corresponding one of the first and second filter elements. The two retainer plates each having the plurality of through-holes formed therethrough are disposed on the axially opposite ends of the corresponding one of the first and second packings, while the core bar extends in the axial direction of the corresponding one of the first and second packings to pass the center of the corresponding one of the first and second packings such that the two retainer plates are engaged with the core bar at the respective opposite ends of the core bar. The core bar is provided with the pull tab at one of the opposite ends of the core bar, so that the first and second packings are introduced into and removed from the first and second sleeves, respectively. This arrangement makes it possible to remove the clogged first and second packings together with the other components of the above-described elements, out of the body of the filter device through the access openings which have been opened by removing the closure members, by simply pulling the core bar which is a part of the filter element, with the operator's finger engaging the pull tab. Besides, this arrangement makes it possible to accommodate new first and second packings together the above-described other components, in the body of the filter device, by simply pushing the core bar at the pull tab into the body of the filter device. Thus, the first and second packings can be removed from and introduced into the above-described body while the access openings are open, without a necessity of using a tool. Thus, the replacement of the first and second packings can be made more easily and quickly than in the conventional device.

Further, in the above-described filter device for compressed air according to the present invention, the core bars constituting the first and second filter elements can be formed of a material such as a synthetic resin, together with the retainer plates, using a single mold. Thus, the present filter device can be produced without a considerable increase in the production cost.

Further, since the filter device for compressed air is constructed such that all the parts cooperating to form the fluid passage in the filter device are formed of a synthetic resin, integrally with each other so as to constitute the body of the filter device as a single unit, as described above, the present filter device assures a remarkable increase in its fluid-tightness reliability, as compared with that of the conventional device wherein separate parts are connected by bolts through suitable packings.

Still further, in the above-described filter device for compressed air according to the present invention, the inlet passage portion and the outlet passage portion are provided with the respective access openings. Therefore, even if the compressed air leaks out from the body through the access openings, the air leakage has a comparatively small influence on the flow velocity and the pressure of the compressed air flowing through the first and second sleeves and the guide passage portion, as compared with an arrangement wherein the compressed air may leak through the first sleeve and/or the second sleeve and/or the guide passage portion. Accordingly, the present construction prevents or minimizes deterioration of the filtering performance of the first and second filter means.

According to a first preferred form of the filter device for compressed air of the present invention, the first packing of the first filter means is a metallic fiber aggregation which is formed by aggregating a large number of short or long fibers made of a metallic material, and wherein the first filter element is formed by fixedly winding the aggregation on the core bar. Thus, it is not necessary to weave or knit the metallic fibers as required in the conventional device, for preparing the first packing. The operation for the preparation of the first packing or the whole filter device is made easier, and therefore the manufacturing cost is reduced. Besides, the first packing is constituted by a comparatively small amount of the metallic fibers, but the condensation and/or coalescence of the vapor and/or liquid particles in the first filter means can be effected as efficiently as in the conventional device. Thus, the construction according to the present first preferred form permits significant reduction of the weight of the filter device and the material cost, without deteriorating the filtering performance.

According to a second preferred form of the filter device for compressed air of the present invention, the second packing of the second filter means is a belt-like fabric mesh formed of cotton fibers, and wherein the second filter element is formed by fixedly winding the belt-like fabric mesh on the core bar.

According to a third preferred form of the filter device for compressed air of the present invention, the body of the filter device is formed of a transparent synthetic resin, as a single unit. This construction makes it possible to observe, through the transparent body, the state of clogging of the first and second packings accommodated in the first and second sleeves and constituting the first and second filter means, respectively, and makes it easy to know a time of replacement of the first and second packings.

According to a fourth preferred form of the filter device for compressed air of the present invention, the closure member has at least one leg provided at a portion thereof opposed to the retainer plates and extending towards the retainer plates, and the closure member is attached to each of the access openings such that the retainer plates are pressed by the at least one leg of the closure member, whereby the retainer plates are prevented from moving upwardly. Thus, in the present preferred form, the engagement of the core bars of the first and second filter elements with the retainer plates effectively prevents upward movements of the retainer plates remote from the closure members, which may take place due to flow of the compressed air, or effectively prevents upward movements of the first and second packings, without the provision of a complicated device. The pressure given by the leg of the closure member to the retainer plates is released by removing the closure member from the body. Therefore, the thus constructed structure for preventing the upward movements of the packings does not bother the replacement of the first and second filter elements, and does not deteriorate the operation for replacing the first and second packings.

BEST MODE FOR CARRYING OUT THE INVENTION

To further clarify the present invention, there will be described in detail one typical embodiment of the present invention by reference to the drawings.

Figure 1:
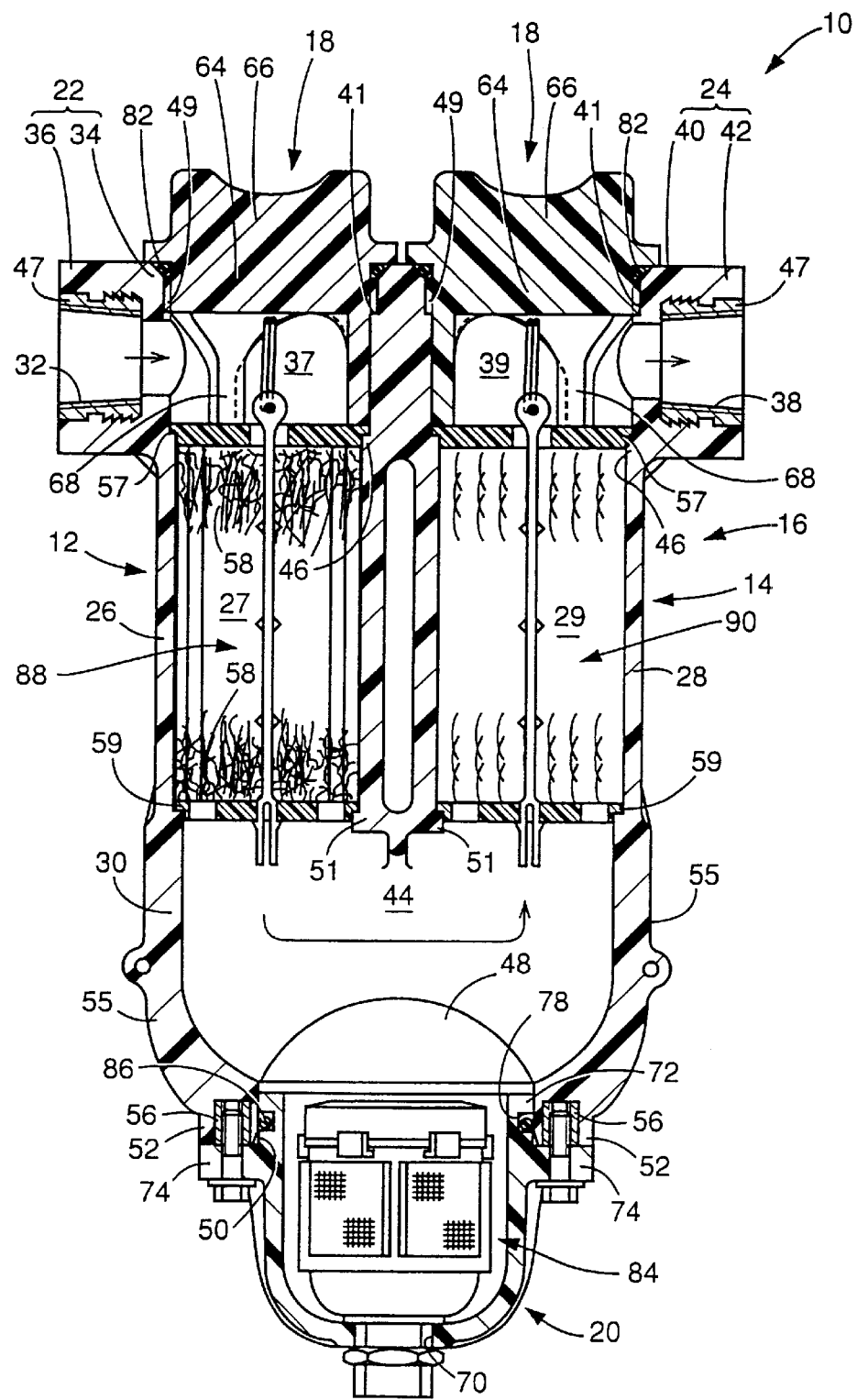
FIG. 1 is an elevational view in vertical cross section showing one example of a filter device for compressed air having a construction according to the present invention.
Figure 2:
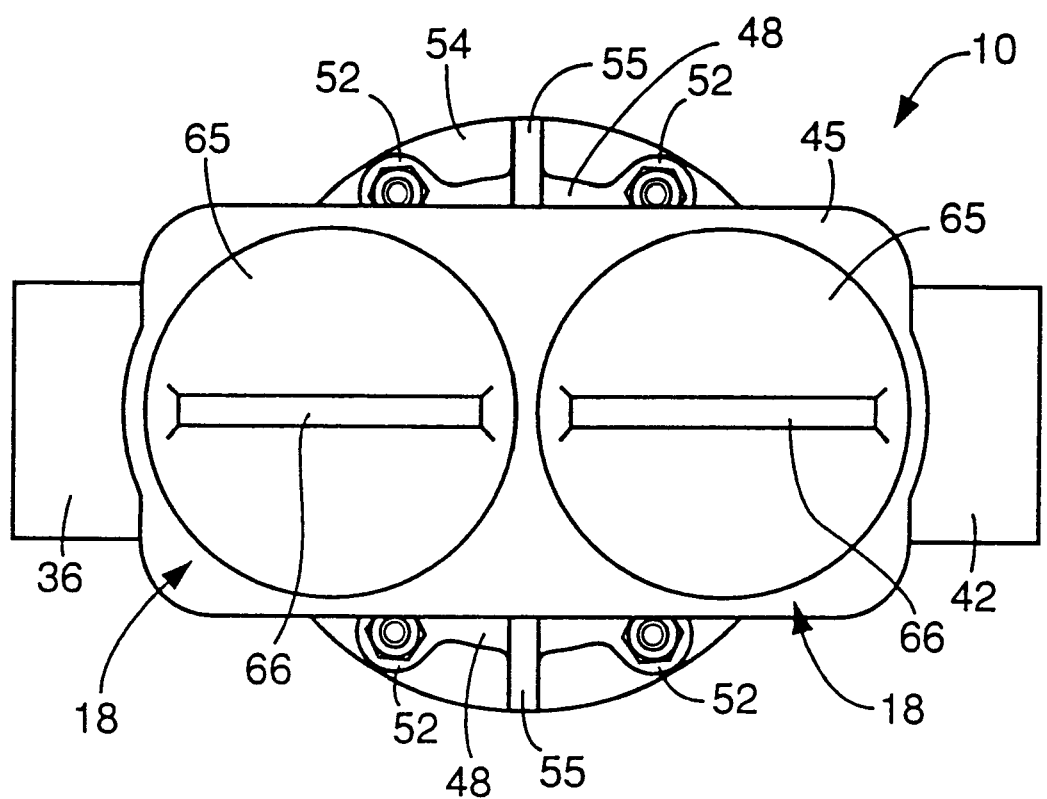
FIG. 2 is a plan view of the filter device shown in FIG. 1.
Figure 3:
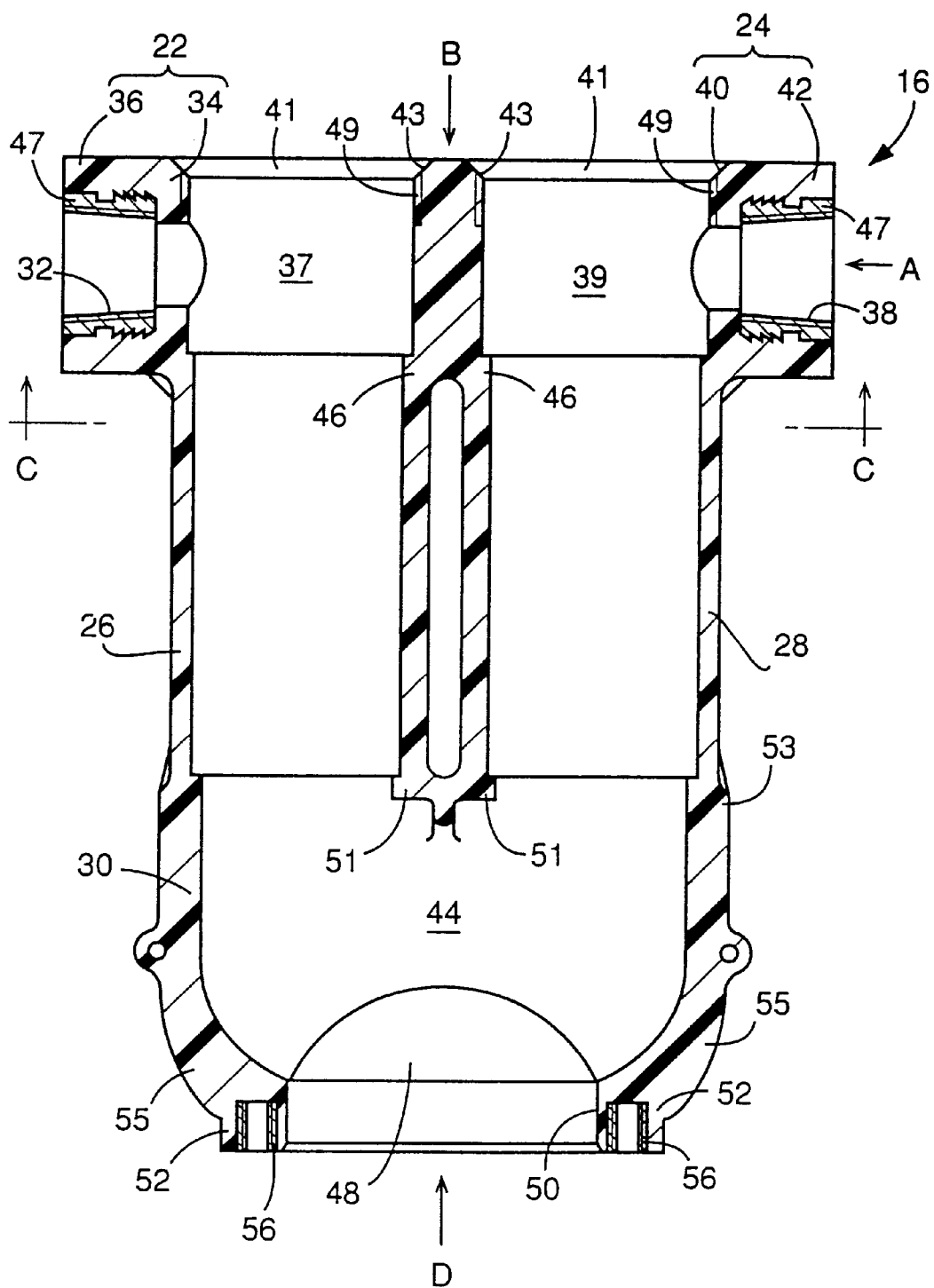
FIG. 3 is an elevational view in vertical cross section showing a body of the filter device of FIG. 1.
Figure 4:
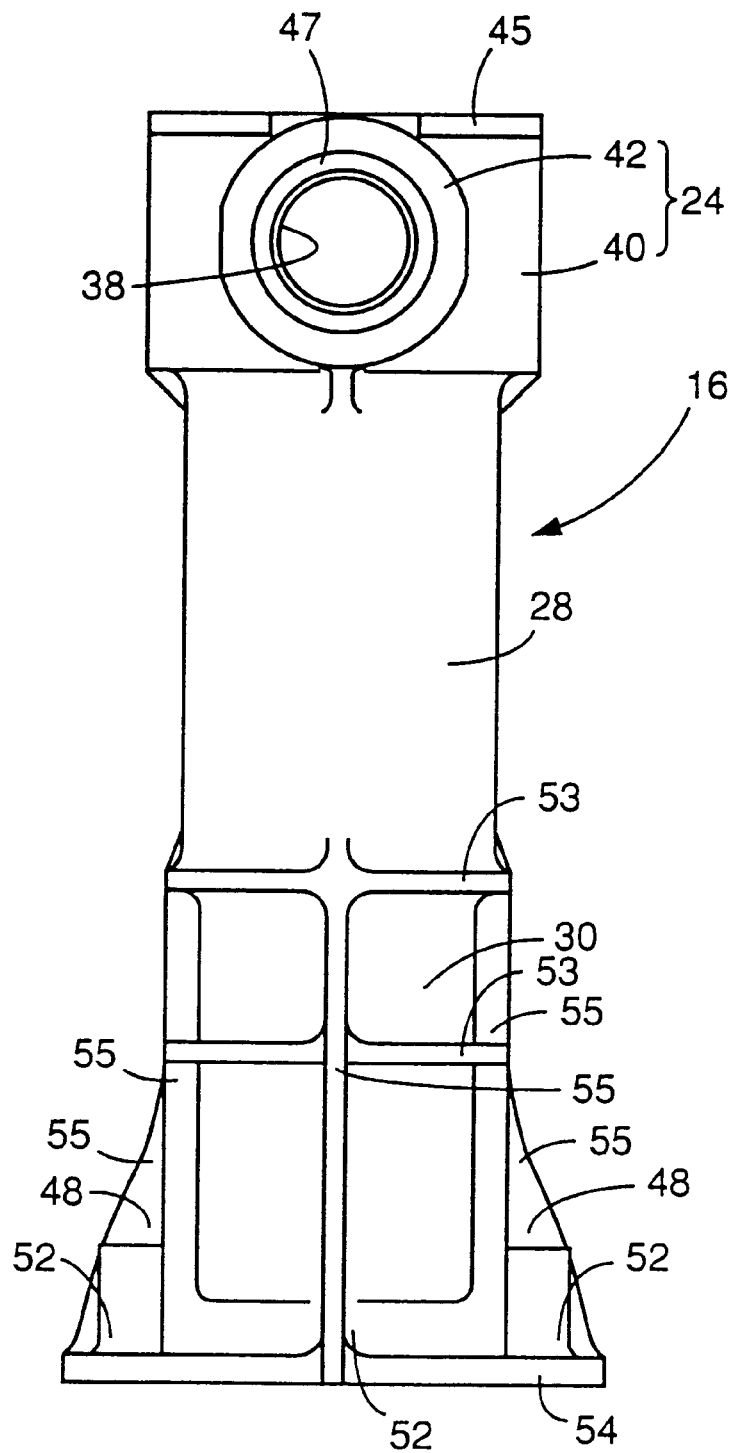
FIG. 4 is a view taken in a direction of arrow A in FIG. 3.
Figure 5:
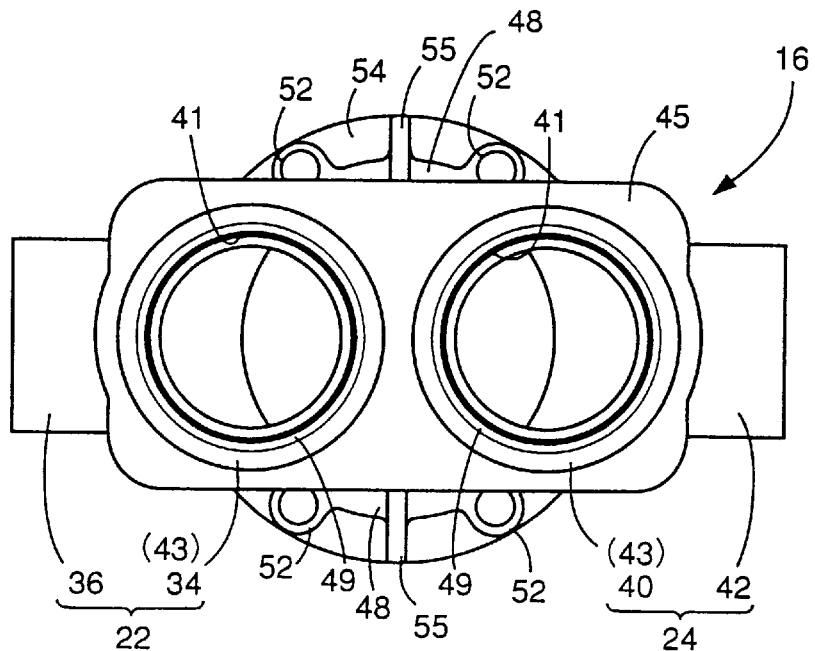
FIG. 5 is a view taken in a direction of arrow B in FIG. 3.
Figure 6:
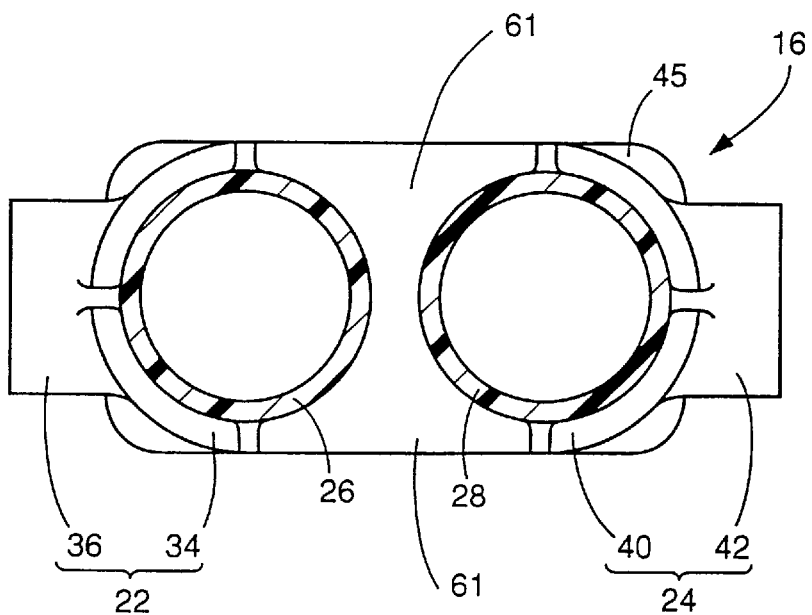
FIG. 6 is a cross-sectional view taken along line C—C in FIG. 3.
Figure 7:
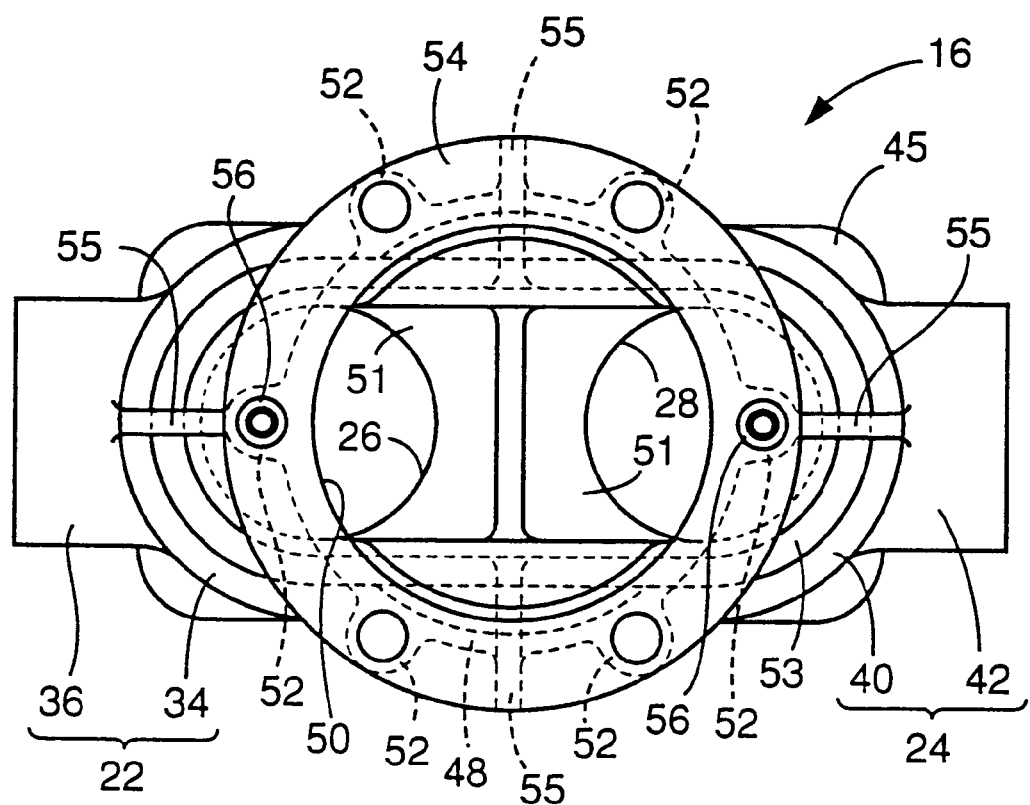
FIG. 7 is a view taken in a direction of arrow D in FIG. 3.

Referring first to FIGS. 1 and 2, there is schematically shown one example of a filter device for compressed air constructed according to the present invention. As is apparent from the figures, the filter device 10 consists of a body 16, two caps 18, 18, a drain unit 20, a first filter element 88 and a second filter element 90. The body 16 accommodates the first and second filter elements 88, 90 therein. The two caps 18, 18 are attached to a top of the body 16, and serve as closure members. The drain unit 20 is attached to a bottom of the body 16.

More specifically described, as shown in FIGS. 3 through 7, the body 16 includes an inlet passage portion 22, an outlet passage portion 24, a first sleeve 26 and a second sleeve 28 and a guide passage portion 30 which are formed integrally with each other, and which cooperate to constitute the body 16.

The inlet passage portion 22 consists of an inlet communication portion 34 and an inlet portion 36. The inlet communication portion 34 takes a substantially cylindrical shape having a large cylindrical wall thickness, and extends parallel to an axial direction of the body 16, i.e., extends in a vertical direction as viewed in FIG. 3. The inlet communication portion 34 has an upper opening communicating with the exterior, and a lower opening communicating with the first sleeve 26. The inlet portion 36 takes a substantially cylindrical shape having a large cylindrical wall thickness and a diameter smaller than that of the inlet communication portion 34. The inlet portion 36 is formed integrally with the inlet communication portion 34 such that the inlet portion 36 extends outwardly from a cylindrical wall of the inlet communication portion 34. The inlet portion 36 communicates on its base side opening (located near the inlet communication portion 34) with the inlet portion 34, while communicating at its open end portion with the exterior. This open end portion serves as an inlet 32 for introducing the compressed air from the exterior into the filter device 10.

The outlet passage portion 24 consists of an outlet communication portion 40 and an outlet portion 42. The outlet communication portion 40 has a construction substantially identical with that of the inlet communication portion 34, while the outlet portion 42 has a construction substantially identical with that of the inlet portion 36. Each of the outlet communication portion 40 and the outlet portion 42 takes a substantially cylindrical shape having a large cylindrical wall thickness. The outlet communication portion 40 having a diameter larger than that of the outlet portion 42 extends parallel to the axial direction of the body 16, i.e., in the vertical direction as viewed in FIG. 3. The outlet communication portion 40 has an upper opening communicating with the exterior, and a lower opening communicating with the second sleeve 28. The outlet portion 42 is formed integrally with the outlet communication portion 40 such that the outlet portion 42 communicates with the outlet communication portion 40 and such that the outlet portion 42 extends outwardly from a cylindrical wall of the outlet communication portion 40. The outlet portion 42 communicates at its open end portion with the exterior. This open end portion serves as an outlet 38 for feeding the compressed air out of the filter device 10 to the exterior. A reference numeral 47 in FIGS. 3 and 4 designates a metallic connector, which is fixed in a hole of each of the inlet 32 and the outlet 38, for connecting a suitable pipe with a corresponding one of the inlet 32 and the outlet 38.

The thus constructed inlet passage portion 22 and the outlet passage portion 24 are arranged in parallel with each other such that the inlet 32 and the outlet 38 extend in a direction perpendicular to the axial direction of the body 16, and such that the inlet 32 and the outlet 38 open in the opposite directions. A portion of the cylindrical wall of the inlet communication portion 34, which portion is radially remote from the inlet portion 36, is connected with a portion of the cylindrical wall of the outlet communication portion 40, which portion is radially remote from the outlet portion 42.

Thus, the inlet passage portion 22 and the outlet passage portion 24 are united with each other. The first sleeve 26 communicates through the inlet passage portion 22 with the exterior, while the second sleeve 28 communicates through the outlet passage portion 24 with the exterior. The inlet passage portion 22 has an inlet passage 37 formed therein, for introducing the compressed air from the exterior into the first sleeve 26 (the first filter means 12). The outlet passage portion 24 has an outlet passage 39 formed therein, for feeding the compressed air out from the second sleeve 28 (the second filter means 14) to the exterior.

Each of the upper and lower openings of the inlet communication portion 34 constituting the inlet passage portion 22 has an inside diameter substantially equal to or slightly larger than that of the first sleeve 26, while each of the upper and lower openings of the outlet communication portion 40 constituting the outlet passage portion 24 has an inside diameter substantially equal to or slightly larger than that of the second sleeve 26. This dimensioning makes it possible to remove and introduce the first filter element 88 including a first packing 27 and constituting the first filter means 12, through the upper and lower openings of the inlet communication portion 34 from and into the body 16, and also to remove and introduce the second filter element 90 including a second packing 29 and constituting the second filter means 14, through the upper and lower openings of the outlet communication portion 40 from and into the body 16 (see FIG. 1). Thus, the upper openings of the inlet communication portion 34 and the outlet communication portion 40 function as access openings 41, 41 through which the first and second elements 88, 90 are removed from and introduced into the first and second sleeves 26, 28, respectively.

Each of the inlet communication portion 34 and the outlet communication portion 40 includes a tapered portion 43 which is chamfered at the inner periphery of a corresponding one of the access openings 41, 41 and an internal thread portion 49 which is internally threaded and which is axially adjacent to the tapered portion 43. The tapered portion 43 has a diameter which increases in the outward direction (upward direction). Further, the inlet communication portion 34 and the outlet communication portion 40 are united at the outer peripheries of their upper end portions, with a generally rectangular plate-like flange 45 which protrudes outwardly from the outer peripheries of the inlet communication portion 34 and the outlet communication portion 40 over a predetermined distance. Besides, each of the outer peripheries of lower end and intermediate portions of the portions 34, 40 is provided with a connecting rib 61.

Each of the first and second sleeves 26, 28 communicating with the inlet communication portion 34 and the outlet communication portion 40, respectively, takes the form of a cylindrical shape. The height and the inside diameter of the first sleeve 26 are substantially equal to those of the second sleeve 28. The inside diameter of the first sleeves 26 is sufficiently larger than that of the inlet 32, while the inside diameter of the second sleeves 28 is sufficiently larger than that of the outlet 38. In other words, the cross sectional areas of fluid flow through the first and second sleeves 26, 28 are larger than the opening areas of the inlet 32 and the outlet 38, respectively. The thus constructed first and second sleeves 26, 28 are united with the inlet communication portion 34 and the outlet communication portion 40, respectively, so as to extend parallel to each other in the axial direction of the body 16, from the lower ends of the inlet communication portion 34 and the outlet communication portion 40, respectively. The first and second sleeves 26, 28 communicate at their lower openings with the guide passage portion 30.

The guide passage portion 30 communicating with the first and second sleeves 26, 28 is a generally cup-shaped structure which is substantially elliptical in horizontal cross section and whose depth is larger than the respective inside diameters of the first and second sleeves 26, 28. Further, the guide passage portion 30 has an outwardly bulging bottom portion 48 having a substantially semi-spherical shape. The bulging bottom portion 48 has a through-hole 50 formed through its bottom wall in communication with the exterior. According to the above-described arrangement, the first and second sleeves 26, 28 communicate with each other through the guide passage portion 30 having a cross sectional area larger than that of the first and second sleeves 26, 28. Thus, the guide passage portion 30 provides a guide passage 44, so that the compressed air is introduced from the first sleeve 26 to the second sleeve 28 through this guide passage 44. The guide passage 44 communicates with the exterior through the through-hole 50 formed through a bottom portion of the guide passage portion 30.

The guide passage portion 30 has a flange 54 integrally formed at a lower end portion of the bulging bottom portion 48 such that the flange 54 extends outwardly from an outer surface of the bottom portion 48. On the flange 54, there are formed six bolt-hole portions 52 which are spaced apart from each other in a circumferential direction of the flange 54 at a predetermined spacing interval. The six bolt-hole portions 52 receive suitable bolts for fixedly attaching the drain unit 20 to the guide passage portion 30. Among the six bolt-hole portions 52, predetermined two bolt-hole portions has respective metallic connectors 56, 56 fixedly received therein, for engagement with the bolts. Further, the guide passage portion 30 has two reinforcing ribs 53, 53 and eight reinforcing ribs 55 formed integrally therewith. One of the two reinforcing ribs 53, 53 is formed on an upper end portion of a cylindrical wall of the guide passage portion 30 so as to extend in a circumferential direction of the guide passage portion 30, while the other of the reinforcing ribs 53, 53 is formed on an intermediate portion of the cylindrical wall of the guide passage portion 30 so as to extend in the circumferential direction of the guide passage portion 30. Each of the eight reinforcing ribs 55 extends in a depth (height) direction of the guide passage portion 30 from the reinforcing rib 53 to the connecting rib 54. Thus, the guide passage portion 30 is reinforced by the ribs 53, 55.

The inlet passage portion 22, the outlet passage portion 24, the first and second sleeves 26, 28 and the guide passage portion 30 which are constructed as described above are integrally formed of a transparent synthetic resin such as polycarbonate, polyethylene terephthalate and polyamide, whereby the body 16 is formed as a one-piece molding of the transparent synthetic resin.

Figure 8:
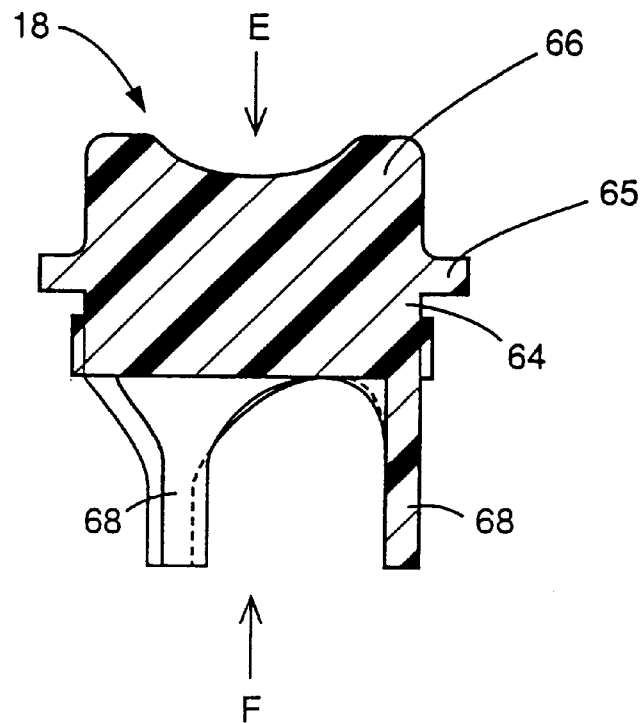
FIG. 8 is an elevational view in vertical cross section showing an example of a closure member which is attached to the filter device shown in FIG. 1.
Figure 9:
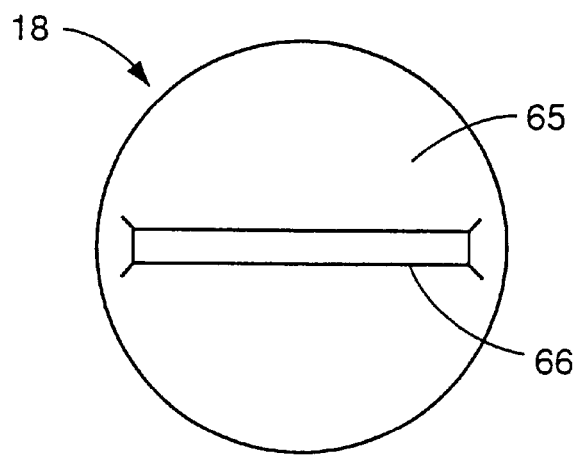
FIG. 9 is a view taken in a direction of arrow E in FIG. 8.
Figure 10:
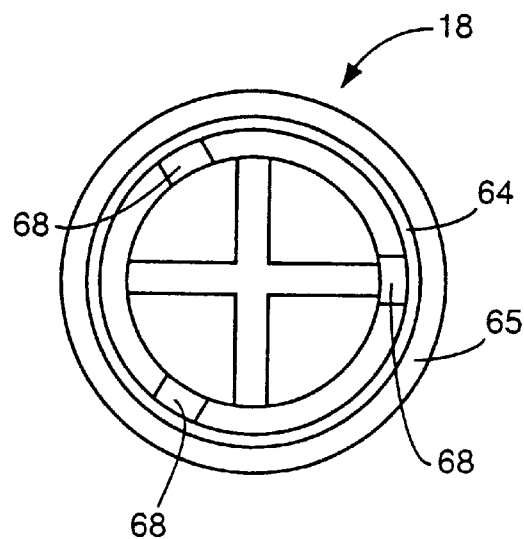
FIG. 10 is a view taken in a direction of arrow F in FIG. 8.

Like the body 16, the caps 18, 18 which are attached to the top of the body 16 are formed of a synthetic resin such as polycarbonate, polyethylene terephthalate and polyamide. As shown in FIGS. 8–10, each of the caps 18, 18 consists of a threaded portion 64, a disc-like hold portion 65, a knob portion 66 and three legs 68. The threaded portion 64 takes a generally cylindrical shape and is integrally formed on a lower face of the hold portion 65. The threaded portion 64 has an external thread formed on its outer circumferential surface and a criss-cross reinforcing rib integrally formed in its interior. The knob portion 66 is integrally formed on an upper face of the hold portion 65, and takes a generally rectangular plate-like shape having a generally arcuate upper side. The three legs 68 are integrally formed on a lower face of the threaded portion 64, and are equi-angularly spaced apart from each other in a circumferential direction of the threaded portion 64. Each of the three legs 68 has predetermined length and width and extends downwardly from an outer peripheral portion of the lower face of the threaded portion 64. One of the three legs 68 is located right below one of the longitudinal end portions of the knob portion 66, whereby the three legs 68 are arranged symmetrically with respect to a plane which passes a center of the hold portion 65 and which is parallel to a principal plane of the knob portion 66.

Figure 11:
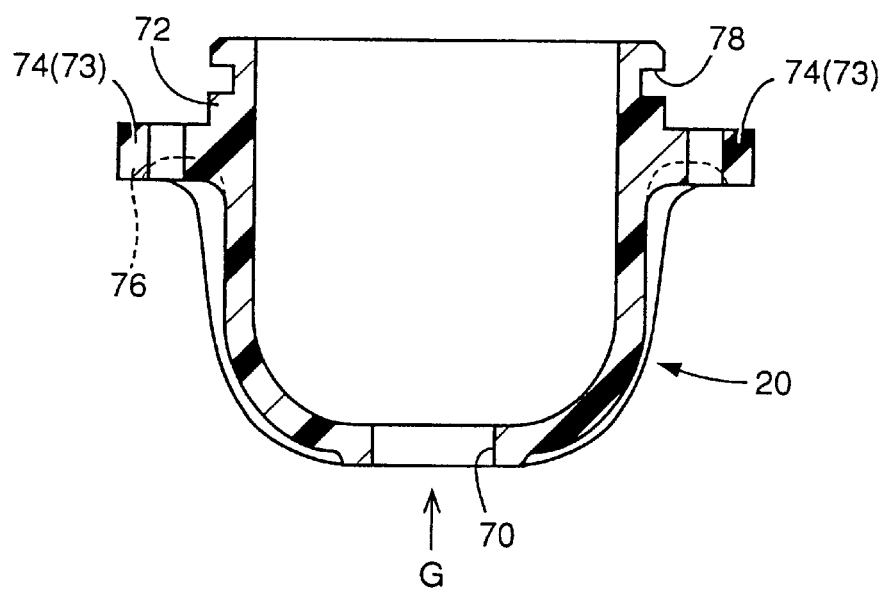
FIG. 11 is an elevational view in vertical cross section showing an example of a drain unit which is attached to the filter device shown in FIG. 1.
Figure 12:
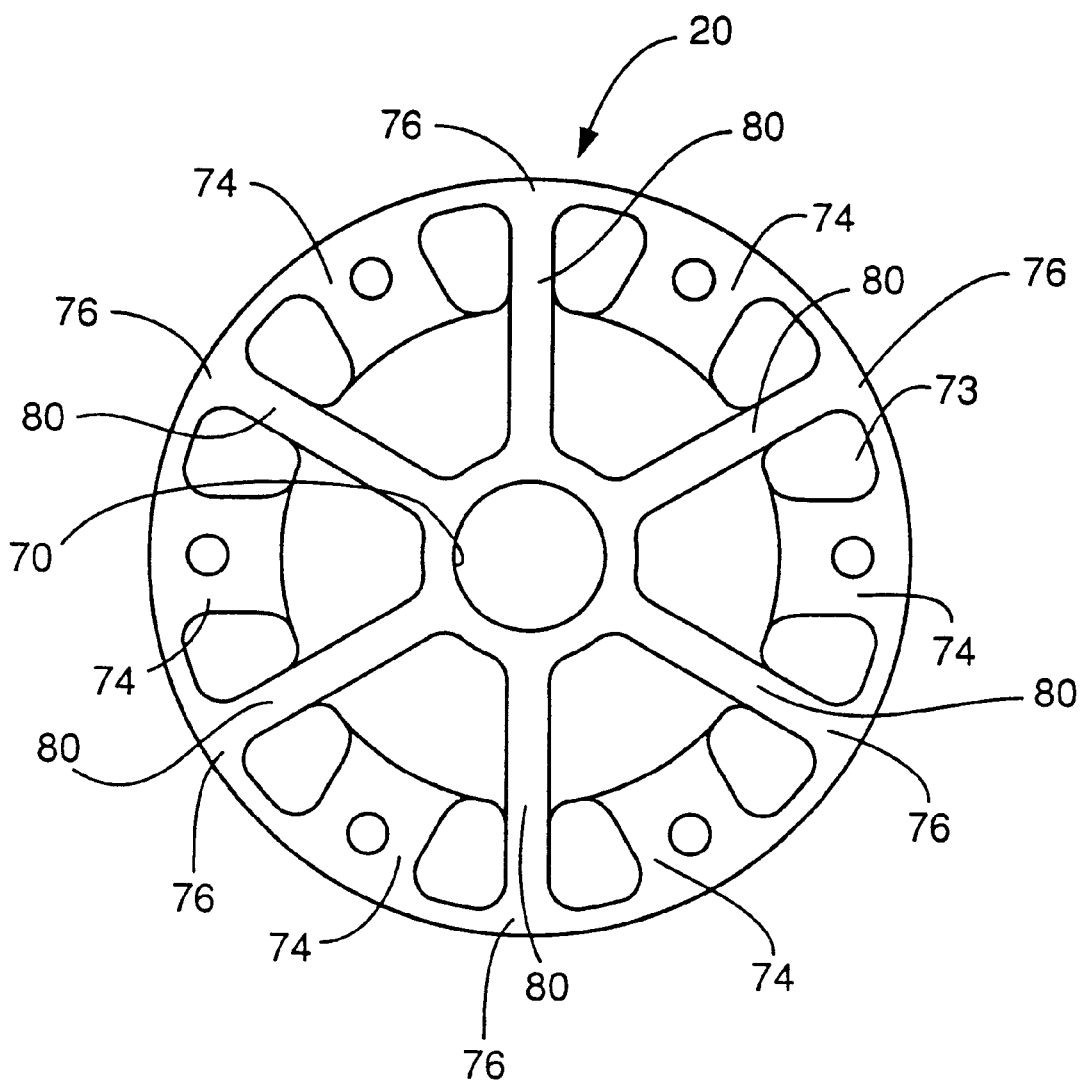
FIG. 12 is a view taken in a direction of arrow G in FIG. 11.

The drain unit 20 which is to be attached to the bottom of the body 16 is formed of the same synthetic resin as the body 16 and the caps 18, 18. The drain unit 20 is a generally cup-shaped member having a small wall thickness, and opens upwardly, as shown in FIGS. 11 and 12. A cylindrical wall of the drain unit 20 includes a thick-walled portion 72 at its upper end portion. The thick-walled portion 72 has a thickness larger than that of the rest of the cylindrical wall by a predetermined amount, and protrudes outwardly. Thus, the outside diameter of the thick-walled portion 72 is substantially equal to or slightly smaller than the inside diameter of the through-hole 50 which is formed through the bottom portion of the guide passage portion 30. On an upper portion of the thick-walled portion 72, there is formed a square groove 78 extending in a circumferential direction of the drain unit 20 and having a predetermined depth. On a lower portion of the thick-walled portion 72, there is integrally formed an outwardly projecting flange 73. There are six bolt-hole portions 74 formed on the flange 73 and equi-angularly spaced apart from each other in the circumferential direction of the drain unit 20. The six bolt-hole portions 74 are connected with each other through a connecting rib 76 extending in the circumferential direction of the drain unit 20 and formed integrally with the six bolt-hole portions 74. The six bolt-hole portions 74 receive suitable bolts for fixedly attaching the drain unit 20 to the guide passage portion 30.

Further, there are six reinforcing ribs 80 integrally formed on an outer circumferential surface of the above-indicated rest of the cylindrical wall of the drain unit 20. The six reinforcing ribs 80 extend vertically from the flange portion 73 toward a bottom wall of the drain unit 20, and are equi-angularly spaced apart from each other, for thereby reinforcing the flange portion 73 and the cylindrical wall of the drain unit 20. A reference numeral 70 in FIGS. 11 and 12 designates a through-hole for receiving a drain valve of an automatic draining device 84 accommodated in the drain unit 20, as described below.

As is apparent from FIGS. 1 and 2, the drain unit 20 constructed as described above is attached to the guide passage portion 30 of the body 16, while the caps 18, 18 are attached to the respective access openings 41, 41 formed in the inlet passage portion 22 and the outlet passage portion 24 constituting the inlet passage 37 and the outlet passage 39, respectively, after the first and second filter elements 88, 90 constructed as described below have been accommodated in the first and second sleeves 26, 28 of the body 16, respectively. Thus, the filter device for compressed air 10 is assembled.

More specifically described, after the automatic draining device 84 has been accommodated in the drain unit 20, the drain unit 20 is attached to the body 16, with an O-ring 86 being disposed in the square groove 78 formed in the outer circumferential surface of the upper end portion (the thick-walled portion 72) of the cylindrical wall of the drain unit 20, such that the upper end portion (the thick-walled portion 72) is fitted in the through-hole 50 formed through the bottom of the bulging bottom portion 48 of the guide passage portion 30 of the body 16, and such that the six bolt-hole portions 74 formed on the flange 73 are located in alignment and abutting contact with the six bolt-hole portions 52 formed on the flange 54 of the guide passage portion 30 of the body 16. A suitable bolt is inserted into each of six holes which are provided by the alignment of the six pairs of bolt-hole portions 52, 72, and is screwed into a suitable nut or into the metallic connector 56 fixedly received in the bolt-hole portions 52. Thus, the drain unit 20 having the automatic draining device 84 accommodated therein is attached to the bottom of the bulging bottom portion 48 of the guide passage portion 30 of the body 16, with the through-hole 50 being fluid-tightly closed.

On the other hand, the first filter element 88 including the first packing 27 and the second filter element 90 including the second packing 29 are accommodated in the first and second sleeves 26, 28, respectively, such that each of the first and second filter elements 88, 90 is engaged with a corresponding one of shoulder portions 46, 46 which are formed at upper opening portions of the respective sleeves 26, 28 and a corresponding one of shoulder portions 51, 51 which are formed at lower opening portions of the respective sleeves 26, 28, whereby the first and second filter means 12, 14 are constituted.

Figure 13:
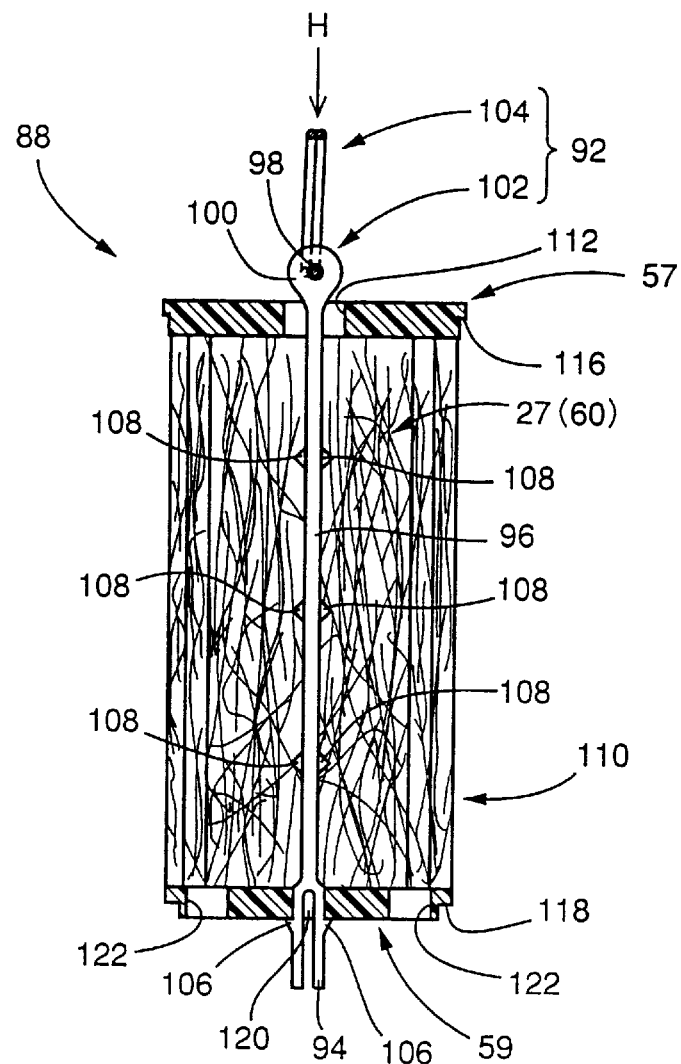
FIG. 13 is an elevational view in vertical cross section showing an example of a first filter element which is accommodated in the filter device shown in FIG. 1.
Figure 14:
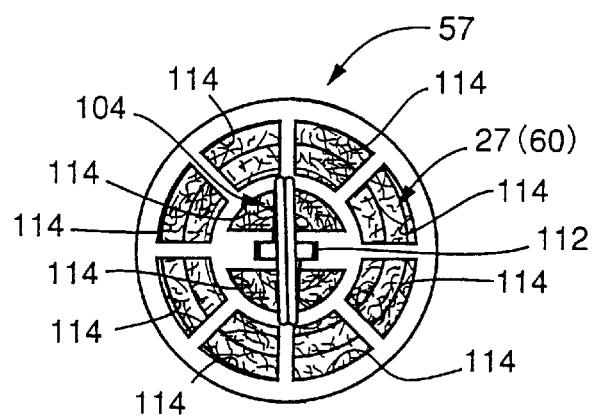
FIG. 14 is a view taken in a direction of arrow H in FIG. 13.

More specifically described, the first filter element 88 consists of the first packing 27, upper and lower retainer plates 57, 59, and a core bar 92, as shown in FIGS. 13 and 14. The core bar 92 has a key ring 104 at one of opposite ends thereof. The first packing 27 is fixedly wound on the core bar 92 which passes through and engages the upper and lower retainer plates 57, 59. The upper and lower retainer plates 57 are held in abutting contacts with the first packing 27 at upper and lower faces of the first packing 27, respectively, as viewed in FIG. 13.

More described in detail, the core bar 92 consists of a body 102 and the key ring 104. The core bar body 102 is integrally formed of the same synthetic resin as used for forming the body 16, the caps 18, 18 and the drain unit 20, and consists of a substantially U-shaped end portion 94, a long column-like intermediate portion 96 having a substantially rectangular cross sectional shape and a disc-like end portion 100 having a through-hole 98 formed through its center. The key ring 104 serves as a pull tab, and is a coil consisting of about two turns of a wire made of a suitable material such as stainless steel and having a predetermined diameter. The key ring 104 passes through the through-hole 98 such that a longitudinal direction of the key ring 104 as seen in the elevational view of FIG. 13 is substantially aligned with an axial direction of the core bar body 102. The U-shaped end portion 94 has two engaging portions 106, 106 formed at a substantially axially intermediate position thereof such that the engaging portions 106, 106 extend outwardly. The intermediate portion 96 has, on its side faces, substantially rectangular pyramid-like protrusions 108 which are spaced apart from each other at a predetermined spacing interval. However, the protrusions 108 do not have to be necessarily provided. The key ring 104 passing through the through-hole 98 has circumferentially opposite ends of the coil which are held in contacts with the respective principal faces of the end portion 100 under pressure produced by its elasticity, whereby the rotation of the key ring 104 about the through-hole 98 is prevented.

Figure 15:
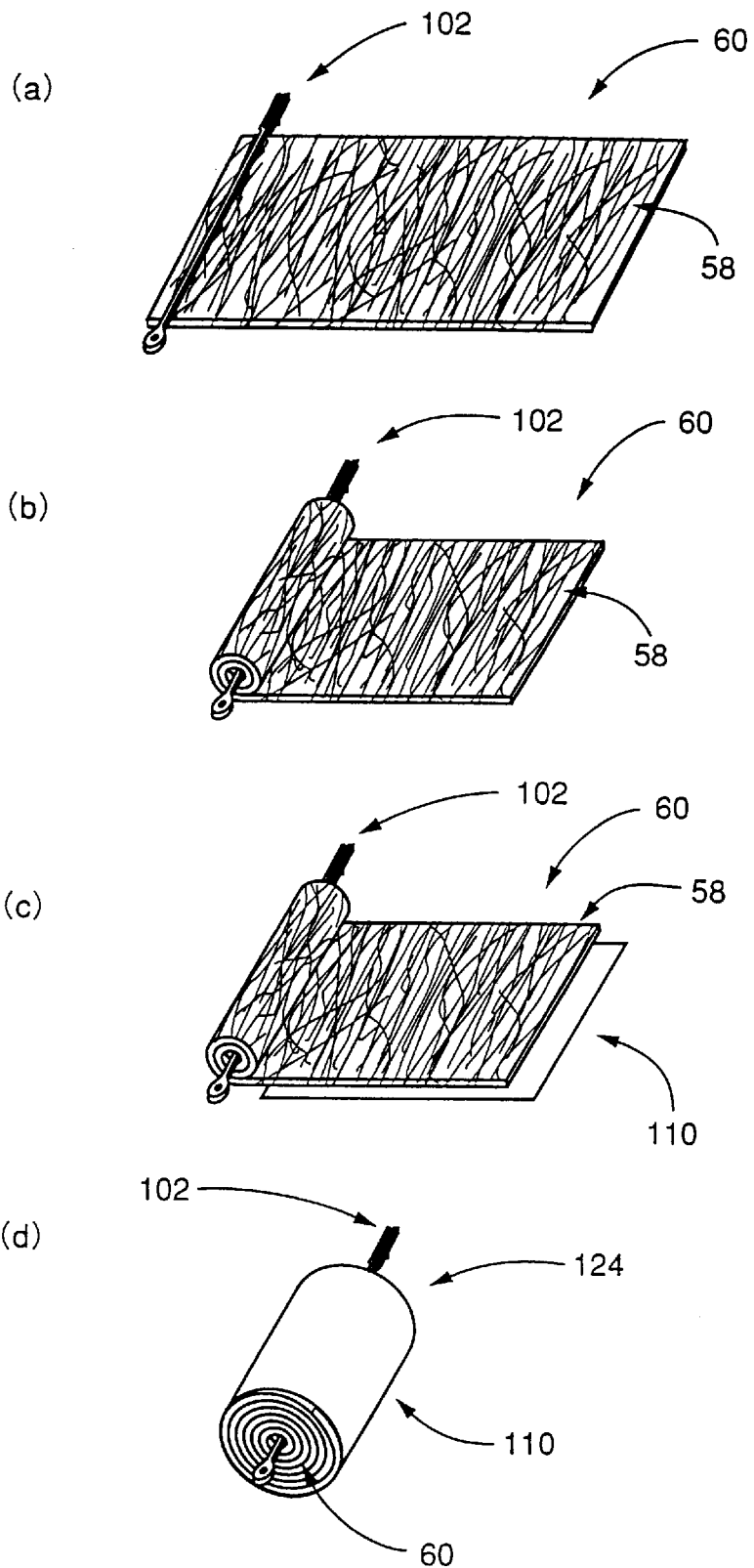
FIG. 15 is an illustration showing a first half of a process for fabricating the first filter element shown in FIG. 13.

The first packing 27 of the first filter means 12 is a metallic-fiber aggregation which is formed by randomly aggregating a large number of short fibers or long fibers 58 made of stainless steel fibers or other metallic materials, such that about 90% of the short fibers or long fibers 58 extend in a direction perpendicular to the winding direction of the metallic-fiber aggregation, while about 10% of the short fibers or long fibers 58 extend in the other directions. As shown in FIG. 15, the large number of the short and long fibers 58 are complicatedly tangled with each other, so as to constitute a sheet-like fabric 60 having a predetermined thickness. The sheet-like fabric 60 is wound on the core bar 62 such that the sheet-like fabric 60 is engaged with the protrusions 108 at an end portion thereof, so that the fabric 60 takes the form of a substantially cylindrical roll corresponding to an internal shape of the first sleeve 29. The fabric 60 in the form of the roll is then wrapped by a film 110 made of a transparent synthetic resin, and is kept in the roll form by three pins provided at respective positions on the outer circumferential surface of the roll so as to fix the fabric 60 to the core bar 92.

The upper retainer plate 57 engages the core bar 92 such that the core bar 92 passes through the retainer plate 57, and is held in abutting contact with the upper face of the first packing 27, as viewed in FIG. 13. The upper retainer plate 57 takes a stepped disc-like shape having a stepped portion 116. The stepped portion 116 takes a shape corresponding to the shoulder portions 46, 46 which are formed at the upper opening portions of the respective first and second sleeves 26, 28. The upper retainer plate 57 has a center hole 112 having a substantially rectangular cross sectional shape and formed through a center of the upper retainer plate 57. Through the center hole 112, the body 102 of the core bar 92 is passed. The upper retainer plate 57 further has a plurality of through-holes 114 formed through a portion around the center hole 112 so as to permit the compressed air to flow through the through-holes 114. On the other hand, the lower retainer plate 59 which is held in abutting contact with the lower face of the first packing 27, as viewed in FIG. 13, takes a stepped disc-like shape having a stepped portion 118. The stepped portion 118 has a shape corresponding to the shoulder portions 51, 51 which are formed at the lower opening portions of the respective first and second sleeves 26, 28. Like the upper retainer plate 57, the lower retainer plate 59 has a center hole 120 which has a substantially rectangular cross sectional shape and a plurality of through-holes 122 through which the compressed air is permitted to flow. As is apparent from FIG. 14, the upper retainer plate 57 engages the key ring 104 of the core bar 92, while the lower retainer plate 59 engages the engaging portions 106, 106 of the core bar 92. The engaging portions 106, 106 which are formed on the U-shaped end portion 94 and which project from the U-shaped end portion 94 are passed through the center hole 120 such that the U-shaped end portion 94 is deformed inwardly. The U-shaped end portion 94 is then restored to its original shape owing to its elasticity after the engaging portions 106 have been passed through the center hole 120, whereby the lower retainer plate 59 is engaged with the engaging portions 106, 106 of the core bar 92.

Figure 16:
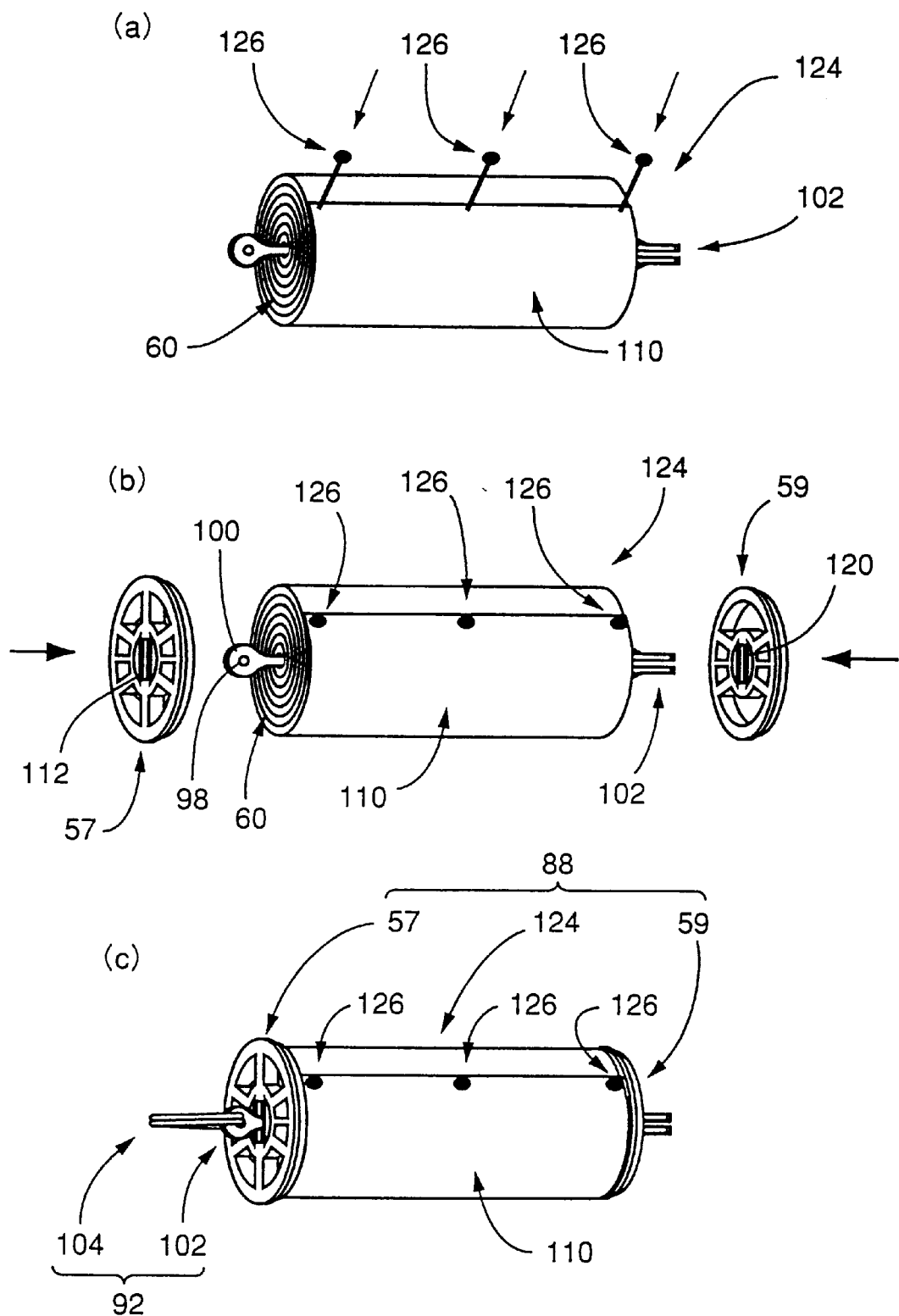
FIG. 16 is an illustration showing a second half of the process for fabricating the first filter element shown in FIG. 13.

The thus constructed first filter element 88 is prepared as shown in FIGS. 15 and 16. First, the core bar body 102 is positioned at one longitudinal end of the sheet-like fabric 60 having predetermined width and length, such that the longitudinal end portion of the fabric 60 engages the substantially rectangular pyramid-like protrusions 108 which are formed on the side faces of the intermediate portion 96 of the core bar body 102. The core bar body 102 is then rolled so that a predetermined length of the sheet-like fabric 60 is wound on the core bar body 102. Then, the transparent synthetic resin-made film 110 is disposed on the outer surface of the unwound portion of the sheet-like fabric 60, and the unwound portion is wound so as to form a first roll 124 wrapped by the film 110 on its outer circumferential surface.

Subsequently, the first roll 124 is adjusted to have a predetermined outside diameter by a suitable method, for example, by introducing the first roll 124 into a suitable cylindrical case having a predetermined inside diameter. Then, the first roll 124 receives three pins 126 provided at the respective positions at an end portion of the film 110, as shown in FIG. 16, so that the first roll 124 maintains a cylindrical shape having an outside diameter substantially equal to the predetermined outside diameter. Then, the lower retainer plate 59 is attached to the core bar body 102 constituting the first roll 124 such that the center hole 120 of the lower retainer plate 59 is engaged with the engaging portions 106, 106 of the core bar body 102, and the end portion 100 of the core bar body 102 is passed through the center hole 112 of the upper retainer plate 57. Then, the key ring 104 is passed through the through-hole 98 formed through the end portion 100 of the core bar body 102. Thus, the upper retainer plate 57 is attached to the core bar 92, and the first filter element 88 is completed.

Figure 17:
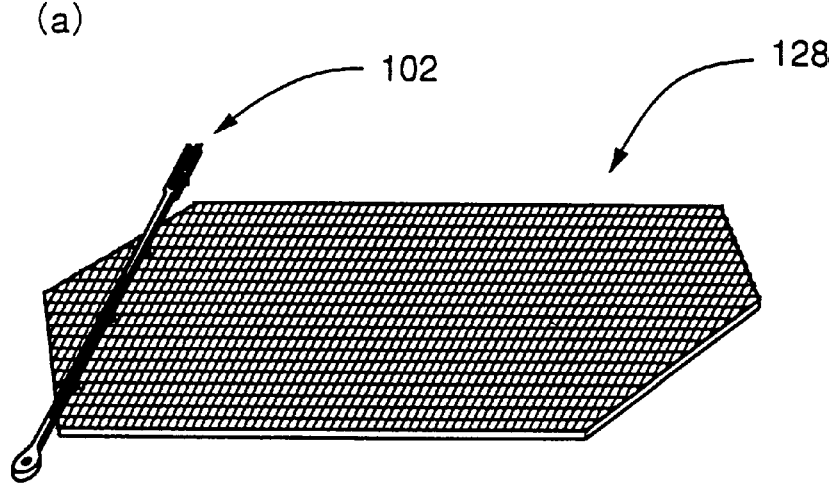
FIG. 17 is an illustration showing a first half of a process for fabricating one example of a second filter element which is accommodated in the filter device shown in FIG. 1.
Figure 17:
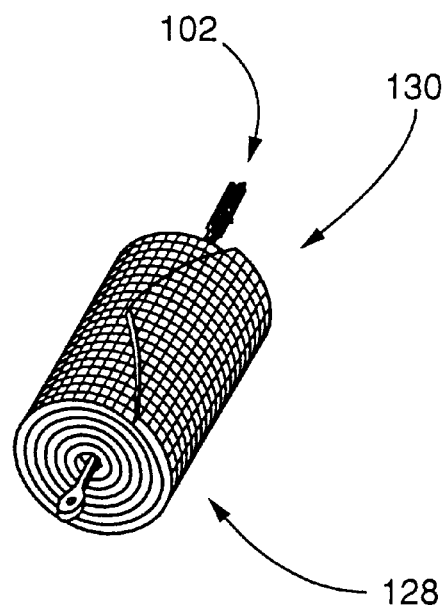
Figure 18:
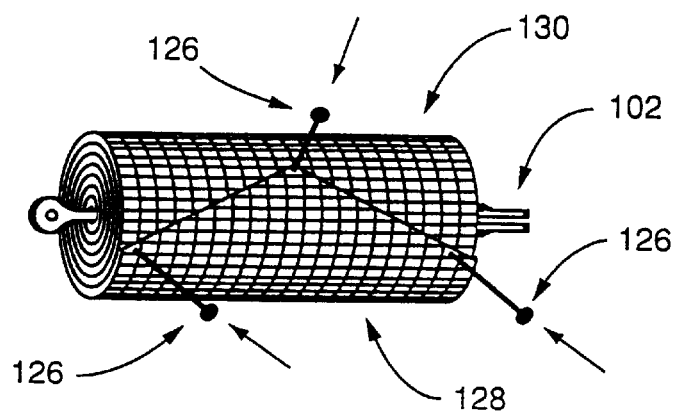
FIG. 18 is an illustration showing a second half of the process for fabricating one example of the second filter element which is accommodated in the filter device shown in FIG. 1.
Figure 18:
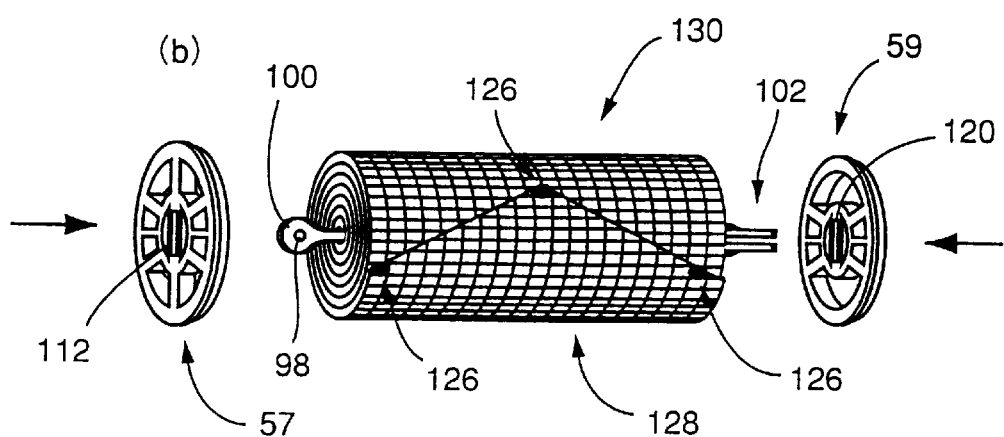
Figure 18:
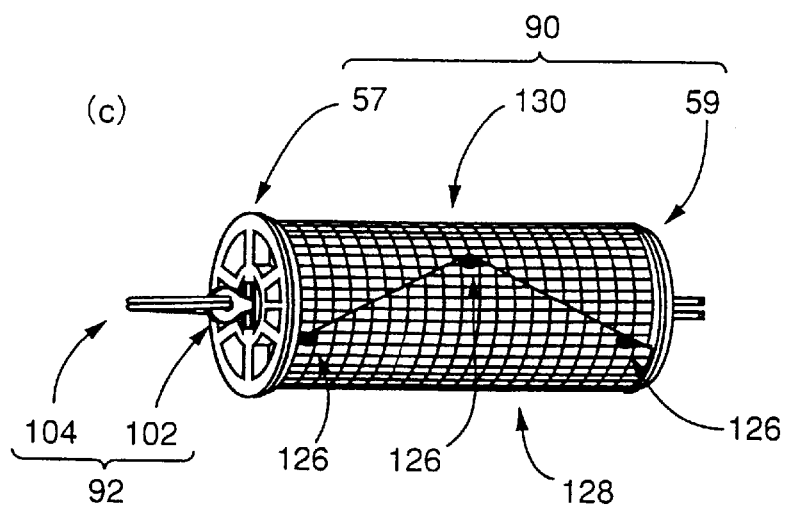

On the other hand, the second filter element 90 which includes the second packing 29 and which is accommodated in the second sleeve to constitute the second filter means 14 is prepared according to a procedure shown in FIGS. 17 and 18. The second filter element 90 includes the second packing 29 which is a belt-like fabric mesh formed of cotton fibers as in the conventional filter device, and is not provided with the film 110 for holding the shape, unlike the first filter element 88. In the other aspects, however, the second filter element 90 is substantially identical with the first filter element 88.

That is, as shown in FIG. 17, the core bar body 102 is positioned at one longitudinal end of a belt-like fabric mesh 128 formed of cotton fibers and having predetermined width and length, such that the longitudinal end portion of the fabric mesh 128 engages the substantially rectangular pyramid-like protrusions 108 which are formed on the side faces of the intermediate portion 96. The core bar body 102 is then rolled so that the fabric mesh 128 is wound on the core bar body 102 for thereby forming a second roll 130. Subsequently, the second roll 130 is adjusted to have a predetermined outside diameter by the same method as adopted for the first roll 124, and the second roll 130 receives three pins 126 provided at the respective positions at an end portion of the fabric mesh 128, as shown in FIG. 18, so that the second roll 124 keeps a cylindrical shape having an outside diameter substantially equal to the predetermined outside diameter. Then, as in the case of the first filter element 88, the lower retainer plate 59 and the upper retainer plate 57 are engaged with the core bar 92 at the respective predetermined positions of the core bar 92, whereby the second filter element 90 is completed.

The first and second filter elements 88, 90 having the constructions as described above are accommodated in the first and second sleeves 26, 28, respectively, such that the stepped portions 116, 118 of the upper and lower retainer plates 57, 59 constituting each of the filter elements 88, 90 are engaged with the shoulder portions 46, 50 of the body 16. Then, the caps 18, 18 are attached to the respective access openings 41, 41 which are formed in the body 16 at the inlet passage portion 22 and the outlet passage portion 24 constituting the inlet passage 37 and the outlet passage 39, respectively.

More specifically described, each of the caps 18, 18 is screwed to the corresponding one of the access openings 41, 41 such that an external thread formed portion of the threaded portion 64 is engaged with the corresponding one of the internal thread portions 49, 49 which are formed in the inlet communication portion 34 and the outlet communication portion 40, and such that the three legs 68 of each of the caps 18, 18 are inserted into the corresponding one of the inlet communication portion 34 of the inlet passage portion 22 and the outlet communication portion 40 of the outlet passage portion 24, while an O-ring 82 is interposed between the disc-like hold portion 65 and the tapered portion 43 of the access opening 41. Thus, the caps 18, 18 are fluid-tightly and removably attached to the respective access openings 41, 41 which are the upper openings of the inlet communication portion 34 and the outlet communication portion 40.

In the present embodiment, the caps 18, 18 are attached to the respective access openings 41, 41 formed in the body 16 as described above such that one of the three legs 68 which is located right below one of the longitudinal end portions of the knob portion 66 is most distant from the inlet 32 or the outlet 38, whereby the longitudinal direction of the knob portion 66 is parallel to the opening direction of the inlet 32 or the outlet 38 while the other two legs 68, 68 are located symmetrically with each other such that the two legs 68, 68 are not exposed to the inlet 32 or the outlet 38. Further, with the caps 18, 18 attached to the body 16 as described above, the three legs 68 of each of the caps 18, 18 inserted into the corresponding one of the inlet communication portion 34 and the outlet communication 40 are held at their ends in abutting contact with the corresponding one of the upper retainer plates 57 fitted in the upper openings of the first and second sleeves 26, 28, with a predetermined abutting force. This arrangement prevents upward movements of the upper retainer plates 57 and the filter elements 88, 90, while each of the first and second filter elements 88, 90 is interposed and gripped by and between the legs 68 and the lower retainer plate 59 which is engaged with the shoulder portion 51.

The caps 18, 18 and the drain unit 20 are attached to the body 16 with the first and second filter elements 88, 90 being accommodated in the first and second sleeves 26, 28, respectively, as described above, to complete the filter device 10 for compressed air, wherein only the inlet 32 and the outlet 38 are open to the exterior, and wherein the compressed air entering the inlet passage portion 22 via the inlet 32 is passed through the first filter means 12, the guide passage portion 30 and the second filter means 14 into the outlet passage portion 24, and is then fed out via the outlet 38. Thus, a fluid passage for the compressed air is formed through the filter device 90.

In the thus constructed filter device 10 for compressed air, vapor and/or liquid particles remaining in the compressed air are separated and removed from the compressed air, as described below.

First, the compressed air supplied through the inlet 32 is introduced through the inlet passage 37 formed in the inlet passage portion 22, into the first filer means 12 having a large cross sectional area. As the compressed air is passed through the first filter means 12, the vapor and/or the liquid particles such as water and oil contained in the compressed air are condensed or coalesced into liquid drops, by an effect of adiabatic expansion, or by an increased capture effect as a result of a reduced velocity of flow of the compressed air through the-first filter means 12, so as to be separated from the compressed air.

Subsequently, as the compressed air which has passed through the first filter means 12 is introduced into the guide passage 44 formed in the guide passage portion 30, the vapor and/or the liquid particles are further condensed or coalesced by further adiabatic expansion or an increased capture effect as a result of further reduction of flow velocity of the compressed air in the guide passage portion 30, since the cross sectional area of the guide passage portion 30 is made larger than that of the first filter means 12.

The liquid drops, which have been produced by the above condensation or coalescence in the guide passage portion 30, or produced by the condensation or coalescence in the first filter means 12 and brought into the guide passage portion 30 by the flow of the compressed air, are effectively separated from the compressed air as a result of the reduced flow velocity of the compressed air, as the compressed air is introduced into the guide passage portion 30 whose cross sectional area is larger. And the separated liquid drops are dropped by gravity, through the through-hole 50 into the drain unit 20 attached to the bottom portion of the guide passage portion 30. In this case, some of the liquid drops may stick to the first packing 27 of the first filter means 12, without being brought into the guide passage portion 30 by the flow of the compressed air. Even these liquid drops are dropped through the guide passage portion 30 into the drain unit 20, due to their own weight. The liquid drops, which have been dropped into the drain unit 20 as described above, are discharged through the automatic draining device 84 to the exterior.

The compressed air, from which the vapor and/or the liquid particles have been separated and removed as described above, is introduced into the second filter means 14 whose cross sectional area is smaller than that of the guide passage portion 30, so that the compressed air is subject to the effect of the adiabatic expansion, or an evaporation effect as a result of an increased velocity of flow of the compressed air through the second filter means 14. Further, as the compressed air is passed through the second packing 29 of the second filter means 14, water and/or oil in the form of liquid particles remaining in the compressed air is evaporated by an effect of whirlpool phenomenon of the air flow, or is absorbed by the second packing 29, while dust in the form of solid particles remaining in the compressed air is captured by the second packing 29.

As a consequence, the compressed air which has been fed out from the outlet 38 through the outlet passage 39 formed in the outlet passage portion 24 does not contain the liquid and solid particles such as the water and oil.

As described above, the filter device 10 for compressed air according to the present embodiment is constructed such that the compressed air introduced through the inlet passage 37 into the body 16 is further introduced into the first filter means 12 so as to be passed through the first packing 27 of the first filter means 12, and is then introduced through the guide passage 44 into the second filter means 14 so as to be passed through the second packing 29 of the second filter means 14, so that the compressed air is cleaned and dried with substantially complete removal of the liquid particles such as water and oil and the solid particles such as dust.

The present filter device 10 having such a good filtering performance is constructed such that the first and second sleeves 26, 28 accommodating the first and second filter elements 88, 90 therein and constituting the first and second filter means 12, 14, respectively, the inlet passage portion 22 defining the inlet passage 37, the guide passage portion 30 defining the guide passage 44 and the outlet passage portion 24 defining the outlet passage 39 are integrated with each other to form the body 16 as a single unit, such that the access openings 41, 41 are formed at the inlet passage portion 22 and the outlet passage portion 24 so as to remove the first and second packings 27, 29 through the access openings 41, 41, and such that the caps 18, 18 are fluid-tightly and removably attached to the respective access openings 41, 41. Unlike the conventional filter device, therefore, the present filter device 10 does not require time-consuming operations such as disassembling of the filter device 10 into its component parts, upon replacing the first and second packings 27, 29 clogged with dust and/or grease. In the present filter device 10, the access openings 41, 41 can be opened by simply removing the caps 18, 18, so that the first and second filter elements 88, 90 are easily exposed to the exterior. Each of the first and second filter elements 88, 90 consists of the core bar 92 having the key ring 104 at its end portion, the corresponding one of the first and second packings 27, 29 each fixedly wound on the core bar 92, and the upper and lower retainer plates 57, 59 engaged with the core bar 92 and held in abutting contact with the axial opposite ends of the corresponding one of the first and second packings 27, 29, as described above. Accordingly, the first and second filter elements 88, 90 including the clogged first and second packings 27, 29 can be removed from the first and second sleeves 26, 28 to the exterior of the body 16 through the access openings 41, 41 from which the caps 18, 18 have been removed, by simply pulling the core bar 92 of the first or second filter element with the fingers holding the key ring 104. Clean first and second packings 27, 29 together with the other components of the first and second filter elements 88, 90 can be accommodated in the first and second sleeves 26, 28 by pushing the sleeves 26, 28 at the key ring 104. After the replacement of the packings 27, 29, all that has to be done is to simply attach the caps 41 to the access openings 41. Thus, it is not necessary to carry out a conventionally required cumbersome operation such as re-assembling the component parts.

Further, the present filter device 10 is constructed such that each of the caps 18, 18 attached to the body 16 consists of the knob portion 66, the hold portion 65 and the threaded portion 64, so that the caps 18, 18 are removably attached to the access openings 41, 41 by engagement of the threaded portions 64 having the respective external threads with the internal thread portions 49 formed on the inlet communication portion 34 and the outlet communication portion 40. According to this construction, it is possible to rotate the caps 18, 18 relative to the respective access openings 41, 41 through the knob portion 66 without using a particular tool, so as to easily attach and remove the caps 18, 18 to and from the access openings 41, 41. Further, since the knob portion 66 has a generally rectangular plate-like shape having a generally arcuate upper surface, a torque can be easily applied to the cap 18 by the thumb and the index finger holding the holding portion 65, further facilitating the operator to attach and remove the cap 18.

In the filter device 10 according to the present embodiment, therefore, the first and second packings 27, 29 of the first and second filter means 12, 14 can be very easily and quickly replaced without any cumbersome and time-consuming operation, which is required in the conventional device.

Further, in the above-described filter device 10, the core bar 92 constituting each one of the first and second filter elements 88, 90 constructed as described above can be formed of a material such as a synthetic resin, together with the retainer plates 57, 59, by a single mold. Thus, the present filter device 10 can be produced without a considerable increase in the cost required for the production, advantageously avoiding an increase in the production cost. The key ring 104 constituting the core bar 92 is passed through the through-hole 98 formed through the end portion 100 of the core bar body 102 such that the longitudinal direction of the key ring 104 is substantially aligned with the axial direction of the core bar body 102, as seen the elevational view of FIG. 13. Further, since the key ring 104 is prevented form rotating about the through-hole 98, the key ring 104 is prevented from falling down in the inlet passage 37 or outlet passage 39 of the filter device 10. As a result, the replacement of the first and second packings 27, 29 can be made more easily and quickly.

Besides, in the filter device 10 according to the present embodiment, the sheet-like fabric 60 which is formed of the large number of short fibers or long fibers 58 made of stainless steel fibers or other metallic materials and which is the first packing 27 of the first filter element 88 is wound on the core bar 92 as a cylindrical roll, and receives the pins 126 through the film 110 made of a transparent synthetic resin provided at the respective positions of the outer circumferential surface of the roll, so as to be fixed to the core bar 92. This construction makes it possible to keep the cylindrical shape of the sheet-like fabric 60, which is generally difficult, and to effectively prevent the short fibers or long fibers 58 made of metallic materials from dropping into the guide passage 44.

Further, since the present filter device 10 is constructed, as described above, such that the first and second sleeves 26, 28, the inlet passage portion 22, the guide passage portion 30 and the outlet passage portion 24 are integrated with each other to form the body 16 as a single unit, the present filter device 10 assures a remarkable increase in fluid-tightness reliability, as compared with that of the conventional device wherein separate parts are connected by bolts through suitable packings.

Further, in the filter device 10 according to the present embodiment, by attaching the caps 18, 18 to the respective access openings 41, 41, the three legs 68 of each of the caps 18, 18 inserted into the corresponding one of the inlet communication portion 34 and the outlet communication 40 is brought into abutting contact at its end with the corresponding one of the upper retainer plates 57, 57 of the first and second filter elements 88, 90 accommodated in the first and second sleeves 26, 28, with a predetermined abutting force. This arrangement does not require any complicated devices to prevent upward movements of the upper retainer plates 57, 57 and the filter elements 88, 90, while the first and second filter elements 88, 90 are interposed and gripped by and between the legs 68 and the lower retainer plates 59 which are engaged with the lower shoulder portions 51 of the body 16. Accordingly, the arrangement effectively prevents movements of the first and second packings 27, 29 constituting the first and second filter elements 88, 90 in the body 16, which movements may be caused by, for example, flows of the compressed air. The abutting force produced by the legs 68 of the cap 18 with respect to the retainer plate 57 is released by removing the cap 18 from the body. Therefore, the thus constructed mechanism for preventing the upward movements of the filter elements 88, 90 does not deteriorate the operation for replacing the first and second packings 27, 29.

Further, in the filter device 10 according to the present embodiment, the three legs 68 of the cap 18 attached to the body 16 are formed on the outer peripheral portion of the lower face of the threaded portion 64 such that the three legs 68 are equally spaced apart from each other in the circumferential direction of the threaded portion 64, and such that the three legs 68 are arranged symmetrically with respect to a plane which passes the center of the hold portion 65 and which is parallel to the principal plane of the knob portion 66. The caps 18, 18 are attached to the respective access openings 41, 41 formed in the body 16 such that one of the three legs 68 which is located right below one of the opposite longitudinal end portions of the knob portion 66 is most distant from the corresponding one of the inlet 32 and the outlet 38, whereby the longitudinal direction of the knob portion 66 is parallel to the opening direction of the inlet 32 or the outlet 38 while the other two legs 68, 68 are located symmetrically with each other such that the two legs 68, 68 are not exposed to the inlet 32 or the outlet 38. Therefore, any one of the three legs 68 does not give a considerable resistance to the flow of the compressed air, whereby an increase in the pressure loss which is caused by the provision of the legs 68 to the cap 18 is minimized in the filter device 10. Further, upon attaching the caps 18, 18 to the body 16, it is possible to minimize the pressure loss and to easily prevent a leakage of the compressed air into the body 16 due to insufficient screwing of the caps 18, 18, by merely aligning the longitudinal direction of the knob portion 66 with the opening direction of the inlet 32 or the outlet 38.

Further, the present filter device 10 according to the present embodiment is constructed such that the access openings 41, 41 closed by the caps 18, 18 are defined by the respective upper openings of the inlet and outlet passage portions 22, 24, which constitute the inlet and outlet passages 37, 39, for introducing the compressed air into the body 16 and feeding out the compressed air to the exterior, respectively. According to this arrangement, even if the compressed air leaks out from the body 16 through the access openings 41, 41, the air leakage has a comparatively small influence on the flow velocity and the pressure of the compressed air flowing through the first and second sleeves 26, 28 and the guide passage portion 30, as compared with an arrangement wherein the compressed air may leak through the first sleeve 26 and/or second sleeve 28 and/or the guide passage portion 30. Accordingly, the present arrangement prevents or minimizes deterioration of the filtering performance of the first and second filter means 12, 14.

Further, in the present filter device 10 according to the present embodiment, wherein the body 16 is made of the transparent synthetic resin, the state of clogging of the first and second packings 27, 29 with dust and/or grease can be observed through the transparent body 16, making it easy to know a time of replacement of the packings 27, 29.

Further, in the present filter device 10, the first packing 27 of the first filter means 12 is a metallic-fiber aggregation which is formed by randomly aggregating a large number of short or long fibers 58 made of metallic materials. Therefore, it is not necessary to weave or knit the metallic fibers 58, as required for the conventional device, for forming the first packing 27, so that the first packing 27 can be formed with improved efficiency and at a reduced cost. Besides, the first packing 27 is constituted by a comparatively small amount of the metallic fibers 58, but has a fiber destiny which is equal to or higher than the one employed in the conventional device. Thus, the first filter means 12 assures an excellent performance in the condensation and/or coalescence of the vapor and/or liquid particles, and has a reduced weight, leading to a reduced weight of the filter device 10, and a reduced material cost owing to the reduced amount of the metallic fibers 58.

Further, in the present filter device 10 according to the present embodiment, the sheet-like fabric 60 as the first packing 27 is a metallic-fiber aggregation which is formed by randomly aggregating the large number of short or long fibers 58 made of stainless steel fibers or other metallic materials such that about 90% of the short or long fibers 58 extend in a direction perpendicular to the winding direction of the metallic-fiber aggregation, while about 10% of the short or long fibers 58 extend in the other directions. Therefore, the sheet-like fabric 60 has a comparatively small flexural strength in the winding direction, facilitating operation for winding the sheet-like fabric 60 on the core bar 92, whereby the required cost for the production of the filter device 10 is further reduced.

While there has been described one embodiment of the present invention, for illustrative purpose only, it is to be understood that the invention is not limited to the details of the described embodiment.

For example, in the above-described embodiment, the core bar 92 constituting each of the first and second filter elements 88, 90 consists of the core bar body 102 and the key ring 102 serving as the pull tab. However, the core bar body and the pull ring may be formed integrally with each other. Besides, the shapes of the core bar 92 and the retainer plates 57, 59 are not limited to those in the above-described embodiment. Further, the construction for engagement of the retainer plates 57, 59 with the core bar 92 is not limited to that in the above-described embodiment, either, and a well-known construction for engagement may be suitably employed.

In the above-described embodiment, the body 16 is integrally formed of a transparent synthetic resin such as polycarbonate, polyethylene terephthalate and polyamide. However, any other kinds of synthetic resin materials may be selected as needed by taking account of a desired strength of the body 16.

In the above-described embodiment, the wound first packing 27 of the first filter element 88 is wrapped by the film 110 made of a synthetic resin over its outer circumferential surface. However, the film 110 does not have to be necessarily provided on the first packing 27. Where the body 16 is made of a non-transparent material, the film 110 may be replaced by a tubular body made of aluminum or other metallic materials and having a thickness of about 0.5–1.0 mm, so that the tubular body is fitted on the outer circumferential surface of the first packing 27, whereby the tubular body cooperates with the first sleeve 26 to constitute a dual safety structure for protecting the sleeve 26 of the body 16 from bursting due to the compressed air. It is to be understood that the thus constructed tubular body made of a metallic material may be applied also to the second filter element 90.

Additionally, a film made of a synthetic resin and having a thickness of about 0.5–1.0 mm may be formed at least on the outer circumferential surfaces of the first and second sleeves 26, 28, or preferably may be formed not only on the outer circumferential surfaces of the sleeves 26, 28 but also on an outer circumferential surface of the guide passage portion 30 other than a portion thereof which is in abutting contact with the drain unit 20, by a well-known method, for example, by applying heat to the film so as to contract the film. This construction alleviates an impact which may be given to the body 16 from the exterior, and also prevents scattering of broken pieces in the event of breakage of the body 16.

In the above-described embodiment, the first packing 27 of the first filter means 12 is a metallic-fiber aggregation which is formed by randomly aggregating the large number of short or long fibers 58 made of stainless steel fibers or other metallic materials such that about 90% of the short or long fibers 58 extend in a direction perpendicular to the winding direction of the metallic-fiber aggregation, while about 10% of the short or long fibers 58 extend in the other directions. The large number of short or long fibers 58 are complicatedly tangled with each other, so as to constitute a sheet-like fabric 60 having a predetermined thickness. However, the first packing 27 may have other structure. For example, the first packing 27 may be a metallic-fiber aggregation which is formed by randomly aggregating a large number of short or long fibers 58 without any predetermined orientation. Further, a random aggregation of the metallic fibers 58 which does not have a specific form can be suitably used together with the above-described film 110, as the first packing 27. If the metallic fiber aggregation not having a specific form is used as the first packing 27, an operation required for forming the first packing 27 into the desired form can be eliminated, making it possible to effectively simplify the production process of the first filter means 12 or the filter device 10. Further, the first packing 27 may be a roll of a wire mesh fabric formed by weaving or knitting suitable metallic steel fibers, or alternatively, a roll of mesh fabric formed by obliquely intersecting and bonding linear synthetic resins diagonally with each other.

Similarly, the second packing 29 of the second filter means 14 is not limited to the belt-like fabric mesh formed of cotton fibers. A known material may be suitably used for the second packing 29.

Further, in the above-described embodiment, the automatic draining device 84 having a known structure is provided in the drain unit 20, so that the liquid, which has dropped and been stored in the drain unit 20 is discharged into the exterior. However, this automatic draining device 84 may be replaced by a known weep valve 102 or any one of known drain devices.

Still further, in the above-described embodiment in which the caps 18, 18 as the closure members are screwed to the access openings 41, 41 with the O-rings 82 interposed therebetween, the construction for attaching the closure members is not limited to that of the embodiment, provided the closure members fluid-tightly close the access openings and are removable from the access openings.

Further, in the above-described embodiment, each of the caps 18, 18 is provided with the three legs 68 formed integrally with the cap 18. The three legs 68 are held in abutting contact with the corresponding one of the upper retainer plates 57, 57 of the first and second filter elements 88, 90 accommodated in the first and second sleeves 26, 28, with a predetermined abutting force, whereby the upward movements of the upper retainer plates 57, 57 and the filter elements 88, 90 are prevented, and each of the first and second filter elements 88, 90 is interposed and gripped by and between the legs 68 and the lower retainer plate 59, which is engaged with the shoulder portion 51, so as to be fixedly accommodated in the first or second sleeve 26, 28. However, the number and the shapes of the legs 68 are not limited to those of the embodiment, and the legs 68 do not have to be necessarily provided where some other fixing means is provided.

Further, it is to be understood that the entire shape of the filter device, the shapes of the closure members, the drain unit, and the other components of the device are not limited to those of the described embodiment.

It is to be understood that the present invention may be embodied with various other changes, modifications and improvements, which may occur to those skilled in the art, without departing from the spirit of the invention.

As is apparent from the foregoing explanation, the filter device for compressed air according to the present invention is constructed such that all the parts cooperating to form a fluid passage in the filter device are formed of a synthetic resin, integrally with each other so as to constitute a body of the filter device. The body is provided with access openings through which the first and second packings are removed. Further, the closure member is removably attached to each of the access openings so as to fluid-tightly close the access openings. According to the present filter device, therefore, for replacing the clogged first and second packings, it is not necessary to carry out time-consuming operations such as disassembling of the filter device into the component parts and an reassembling of the parts into the device. In the present filter device, the access openings are easily opened and closed, by simply removing the caps from the respective access openings and re-attaching the caps to the respective access openings, so that the first and second packings are easily exposed to the exterior. Further, each of the first and second filter elements is constituted such that the two retainer plates are disposed on the axially opposite ends of the corresponding one of the first and second packings, and such that the core bar axially passing the center of the corresponding one of the first and second packings is engaged with the two retainer plates at the opposite end portions of the core bar and is provided with the pull tab at one of the opposite end portions, so that the filter elements can be removed from and introduced into the first and second sleeves, respectively, by holding the pull tab. Accordingly, the first and second packings together with the other components of the first and second filter elements can be removed from and introduced into the above-described body through the respective access openings which are opened by removing the closure members from the access openings, without a necessity of using a tool. Thus, the removal and introduction of the first and second packings from and into the body, when the access openings are open, can be made without using a tool, whereby the replacement of the first and second packings can be made more easily and quickly than in the conventional device.

INDUSTRIAL APPLICABILITY

As is apparent from the foregoing explanation, the present invention relates to a filter device for compressed air which has filter means having suitable packings accommodated in respective sleeves, and advantageously provides such a filter device wherein the suitable packings can be easily and quickly replaced.

What is claimed is:

1. A filter device for compressed air, including first filter means having a first packing accommodated in a first sleeve thereof, second filter means having a second packing accommodated in a second sleeve thereof, an inlet passage portion defining an inlet passage which connects an exterior of said filter device and said first sleeve to introduce said compressed air from said exterior into said first filter means, a guide passage portion defining a guide passage which connects said first sleeve and said second sleeve to guide said compressed air from said first filter means into said second filter means, and an outlet passage portion defining an outlet passage which connects said second sleeve and said exterior to feed said compressed air out of said second filter means to said exterior, said compressed air which has been introduced through said inlet passage portion being introduced through said first filter means into said guide passage portion, whereby vapor or liquid particles contained in said compressed air are condensed or coalesced to be separated from said compressed air, said compressed air from which said vapor or liquid particles have been separated being further introduced through said guide passage portion into said second filter means, whereby said liquid particles remaining in said compressed air are removed, said filter device being characterized in that:

said first and second sleeves, said inlet passage portion, said guide passage portion and said outlet passage portion are formed of a synthetic resin, integrally with each other, so as to constitute a body of said filter device, said body being provided with access openings through which said first and second packings are removed from said filter device, each of said access openings being provided with a closure member which is removably attached to each of said access openings so as to fluid-tightly close said access openings;

said first sleeve includes a communication portion which communicates with said inlet passage portion and which is large enough to permit said first packing accommodated in said first sleeve to be removed therethrough, while said second sleeve includes a communication portion which communicates with said outlet passage portion and which is large enough to permit said second packing accommodated in said second sleeve to be removed therethrough, said access openings being formed in said inlet and outlet passage portions so that said first and second packings can be removed through said access openings from said first and second sleeves, respectively; and each one of said first and second packings cooperates with two retainer plates and a core bar to constitute a corresponding one of first and second filter elements, said two retainer plates each having a plurality of through-holes formed therethrough being disposed on axially opposite ends of said corresponding one of said first and second packings, said core bar extending in an axial direction of said corresponding one of said first and second packings to pass a center of said corresponding one of said first and second packings such that said two retainer plates engage said core bar at respective opposite ends of said core bar, said core bar being provided with a pull tab at one of said opposite ends of said core bar, so that said first and second packings are introduced into and removed from said first and second sleeves, respectively.

2. A filter device for compressed air according to claim 1, wherein said first packing of said first filter means is a metallic fiber aggregation which is formed by aggregating a large number of short or long fibers made of a metallic material, and wherein said first filter element is formed by fixedly winding said metallic fiber aggregation on said core bar.

3. A filter device for compressed air according to claim 1, wherein said second packing of said second filter means is a belt-like fabric mesh formed of cotton fibers, and wherein said second filter element is formed by fixedly winding said belt-like fabric mesh on said core bar.

4. A filter device for compressed air according to claim 1, wherein said body is formed of a transparent synthetic resin, as a single unit.

5. A filter device for compressed air according to claim 1, wherein said closure member has at least one leg provided at a portion thereof opposed to said retainer plates and extending towards said retainer plates, and said closure member is attached to each of said access openings such that said retainer plates are pressed by said at least one leg of said closure member, whereby said retainer plates are prevented from moving towards said access openings in said axial direction.

6. A filter device for compressed air according to claim 1, wherein said pull tab includes a ring which is attached to one of said opposite ends of said core bar such that said ring passes through a through-hole formed through said core bar at said one of said opposite ends, and wherein said ring prevents said retainer plates from moving relative to said core bar which passes through center holes of said retainer plates.

7. A filter device for compressed air according to claim 1, wherein said core bar includes a U-shaped portion which is elastically deformable, at the other of said opposite ends remote from said pull tab, said U-shaped portion having an engaging portion formed on outer side face thereof and passing through a center hole of one of said retainer plates such that said engaging portion engages a peripheral portion of said center hole, whereby said retainer plates are prevented from moving relative to said core bar.

* * * * *

UNITED STATES PATENT AND TRADEMARK OFFICE
CERTIFICATE OF CORRECTION

PATENT NO : 6,159,259
DATED : December 12, 2000
INVENTOR(S) : Sadao MAEDA

It is certified that error appears in the above-identified patent and that said Letters Patent are hereby corrected as shown below:

On title page, item 54, Title of Patent, replace "FILTER FOR COMPRESSED AIR" with --FILTER DEVICE FOR COMPRESSED AIR--.

Signed and Sealed this

First Day of May, 2001

*Attest:*

NICHOLAS P. GODICI

*Attesting Officer*      *Acting Director of the United States Patent and Trademark Office*